US010372568B2

(12) United States Patent
Degura et al.

(10) Patent No.: US 10,372,568 B2
(45) Date of Patent: Aug. 6, 2019

(54) ELECTRONIC DEVICE BEING CONNECTABLE TO EXTERNAL DEVICE, AND METHOD OF CONTROLLING ELECTRONIC DEVICE BEING CONNECTABLE TO EXTENAL DEVICE

(71) Applicant: CANON KABUSHIKI KAISHA, Tokyo (JP)

(72) Inventors: Yasusaburo Degura, Tokyo (JP); Hidenori Shiba, Tokyo (JP); Masakazu Nakadokoro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/653,631

(22) Filed: Jul. 19, 2017

(65) Prior Publication Data
US 2018/0024899 A1 Jan. 25, 2018

(30) Foreign Application Priority Data

Jul. 20, 2016 (JP) .................. 2016-142722
Jul. 20, 2016 (JP) .................. 2016-142723
Jul. 20, 2016 (JP) .................. 2016-142724

(51) Int. Cl.
*G06F 3/08* (2006.01)
*G06F 11/22* (2006.01)
(Continued)

(52) U.S. Cl.
CPC ........ *G06F 11/221* (2013.01); *G06F 11/2247* (2013.01); *G06F 13/00* (2013.01);
(Continued)

(58) Field of Classification Search
CPC .............. G06F 11/221; G06F 11/2247; G06F 11/2215; G06F 13/00; G06F 13/385; H01R 13/7039; H01R 24/62
(Continued)

(56) References Cited

U.S. PATENT DOCUMENTS

2008/0309313 A1* 12/2008 Farrar .................... G06F 1/266
323/351
2016/0116509 A1* 4/2016 Kim ..................... G01R 31/045
361/86
(Continued)

FOREIGN PATENT DOCUMENTS

JP  2007-094659 A  4/2007
JP  2014-056287 A  3/2014

OTHER PUBLICATIONS

Universal Serial Bus Type-C Cable and Connector Specification, Revision 1.0 Aug. 11, 2014 (171 pages).
(Continued)

*Primary Examiner* — Douglas Q Tran
(74) *Attorney, Agent, or Firm* — Cowan, Liebowitz & Latman, P.C.

(57) ABSTRACT

An electronic device has a first terminal for receiving power from a connected external device, a second terminal for obtaining information of the external device, and a GND terminal connected to the second terminal. The electronic device causes a resistance between the second terminal and the GND terminal to change, and determines a type of the external device based on a voltage of the first terminal after the resistance is caused to change.

49 Claims, 13 Drawing Sheets

(51) Int. Cl.
*G06F 13/00* (2006.01)
*G06F 13/38* (2006.01)
*H01R 13/703* (2006.01)
*H01R 24/62* (2011.01)

(52) U.S. Cl.
CPC ........ *G06F 13/385* (2013.01); *G06F 11/2215* (2013.01); *H01R 13/7039* (2013.01); *H01R 24/62* (2013.01)

(58) Field of Classification Search
USPC ........................ 358/520, 1.1, 1.15, 1.14, 1.13
See application file for complete search history.

(56) References Cited

U.S. PATENT DOCUMENTS

2016/0364360 A1* 12/2016 Lim ........................ G06F 13/385
2017/0127203 A1* 5/2017 Ryu ........................ H04R 3/12

OTHER PUBLICATIONS

Universal Serial Bus Type-C Cable and Connector Specification, Revision 1.1 Apr. 3, 2015 (180 pages).

* cited by examiner

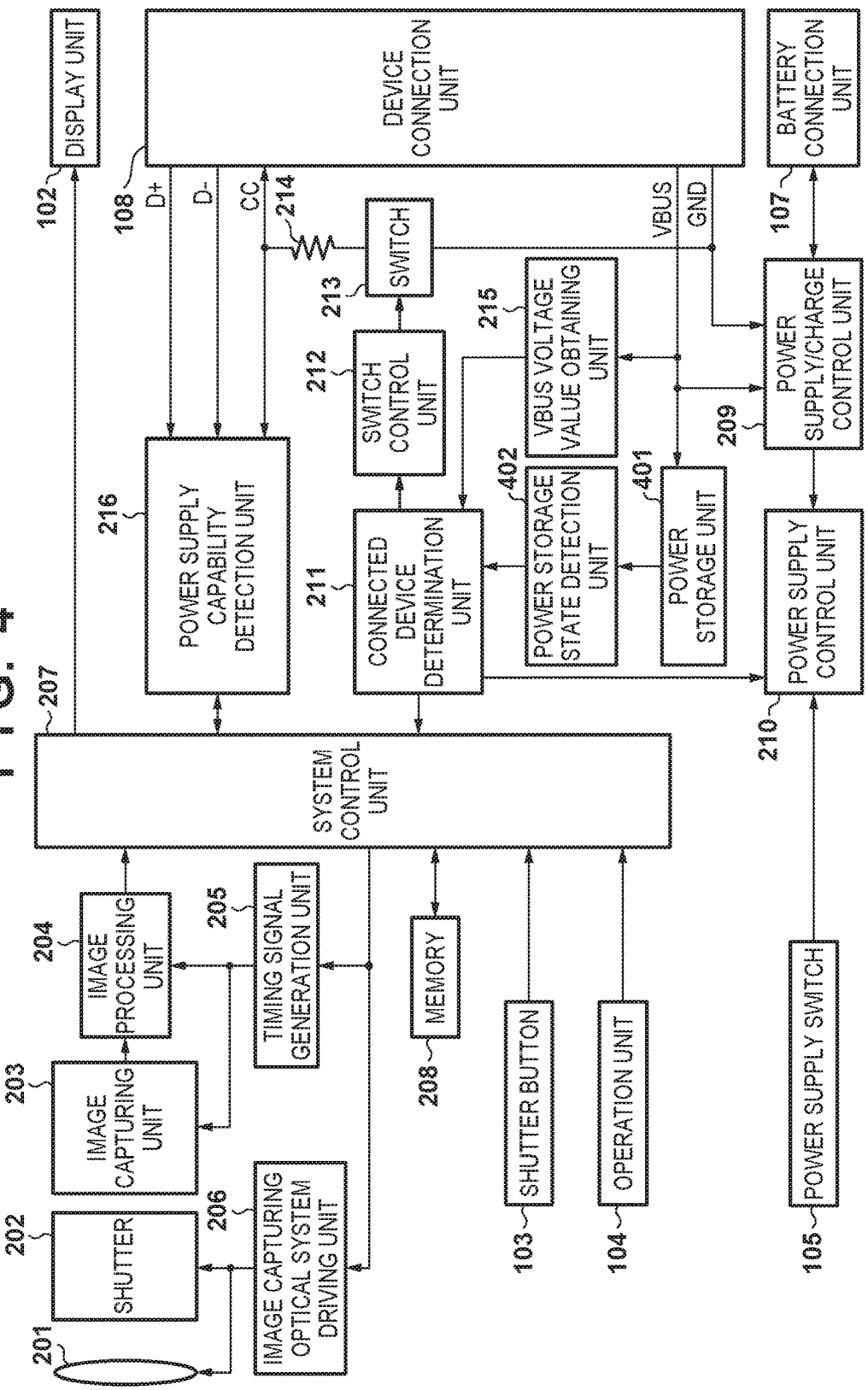
F I G. 4

ELECTRONIC DEVICE BEING CONNECTABLE TO EXTERNAL DEVICE, AND METHOD OF CONTROLLING ELECTRONIC DEVICE BEING CONNECTABLE TO EXTENAL DEVICE

BACKGROUND OF THE INVENTION

Field of the Invention

The present invention relates to an electronic device that can determine a type of an interface of a connected external device, and a method of controlling the same.

Description of the Related Art

In a USB 3.1 standard, a USB Type-C cable and connector are standardized, and various standards such as USB Power Delivery and USB Battery Charging are supported in addition to conventional USB 2.0. In the present specification, a device having an interface that complies with a USB Type-C specification is referred to as a Type-C device. In addition, devices that have a USB interface that does not comply with a USB Type-C specification, such as those for the USB 2.0 standard or the USB Battery Charging standard for example, are referred to as non-Type-C devices. In addition, USB Type-C is simply recited as Type-C.

Causing an electronic device to operate or charging an attached battery apparatus by power received via a USB Type-C cable is known. In a Type-C device, it is possible to detect a power supply ability of a connected external device and manage power used, based on a CC (Configuration Channel) terminal voltage.

In contrast, in a non-Type-C device such as that of the conventional USB 2.0 standard or the USB Battery Charging standard, a power supply ability of a connected device is detected by enumeration or a connection destination detection at a D+ terminal and a D− terminal. In other words, a detection method for a power supply ability of an external device differs between a Type-C device that is an electronic device compliant with Type-C, and a non-Type-C device that is an electronic device not in compliance with Type-C.

In addition, among USB Type-C cables, there are cables where one end is a USB Type-C connector and the other end is non-Type-C USB 2.0 standard A connector. Accordingly, an electronic device to which a USB Type-C cable can be connected needs to detect whether a connected external device is a Type-C device or a non-Type-C device.

As described above, if an electronic device that receives power (also referred to as a sink device, a UFP side, or a power-reception-side device) and an electronic device that supplies power (referred to as a source device, a DFP side, or a power-supply-side device) are both Type-C devices, the power-reception-side device can recognize a power supply ability of the power-supply-side device by identifying a CC terminal voltage. In contrast, when the power-reception-side device is a Type-C device and the power-supply-side device is a non-Type-C device, the power-reception-side device needs to perform enumeration or a connection destination detection that uses D+/D− signals to recognize the power supply ability of the power-supply-side device. In Japanese Patent Laid-Open No. 2014-56287 (hereinafter referred to as D1), the power supply ability of a power-supply-side device is determined by detecting D+/D− voltage dividing resistor values for the power-supply-side device in accordance with connection/disconnection of pull-up (pull-down) resistors to D+/D− at a power-reception-side device.

In addition, to determine a type of a connected power-supply-side device in a power-reception-side device, a power supply for operating a determination unit that is a configuration for executing such a determination is necessary. Japanese Patent Laid-Open No. 2007-94659 (hereinafter referred to as D2) proposes a configuration for causing a determination unit to operate without using a power storage unit such as a battery or a capacitor, by using USB VBUS power.

However, D1 teaches a method for detecting the power supply ability of a non-Type-C device, and does not teach detecting whether a connected external device is a Type-C device or a non-Type-C device.

In Type-C, by the CC terminal voltage, it is possible to detect the power supply ability of a connected external device, and manage power used. However, there is a problem in that, if a non-Type-C device is connected, when the CC terminal voltage is used to attempt to detect a power supply ability, the power supply ability may be misjudged, power greater than an actual power supply ability may be used, and operation may stop.

In addition, in Type-C, there are cases where power is not supplied from VBUS. For example, if a CC terminal of a power-reception-side device is not pulled-down via a resistor having a predetermined resistance, a VBUS voltage from a power-supply-side device is not supplied. In the aforementioned D2, because power from VBUS is used, if power from VBUS is not supplied, a situation in which it is not possible for a determination unit to determine the power supply ability of a connected external device may occur. In addition, using a battery attached to an electronic device can be considered, but if the battery is removed or if sufficient power cannot be supplied (when there is insufficient charge), power is not supplied to a determination unit, and determining the power supply ability of an external device becomes impossible.

SUMMARY OF THE INVENTION

According to one embodiment of the present invention, an electronic device that can detect whether a connected external device is a Type-C device or a non-Type-C device and a method of controlling the same are disclosed.

In addition, according to one embodiment of the present invention, an electronic device that can more reliably determine a type of an interface of a connected external device, and a method of controlling the same are disclosed.

Furthermore, according to one embodiment of the present invention, an electronic device that can determine a type of an external device without using a power storage unit such as a battery or a capacitor even if power of the external device is not supplied from a power supply terminal such as VBUS, and a method of controlling the same are disclosed.

An electronic device in accordance with one aspect of the present invention is provided with the following configuration.

Specifically, according to one aspect of the present invention, there is provided an electronic device, comprising: a first terminal for receiving power from a connected external device; a second terminal for obtaining information of the external device; a GND terminal connected to the second terminal; a control unit configured to cause a resistance between the second terminal and the GND terminal to change; and a determination unit configured to determine a type of the external device based on a voltage of the first terminal after the control unit causes the resistance to change.

According to another aspect of the present invention, there is provided an electronic device, comprising: a first terminal for receiving power from a connected external device; a second terminal for obtaining information of the external device; a control unit configured to control a voltage of the second terminal; and a determination unit configured to determine a type of the external device in accordance with a voltage of the first terminal after a predetermined period has elapsed since the control unit changed the voltage of the second terminal from a voltage included in a predetermined range to a voltage not in the predetermined range.

According to another aspect of the present invention, there is provided a control apparatus, comprising: a first control unit configured to control a power reception process for receiving power from a connected external device via a first terminal; a second control unit configured to control a resistance between a GND terminal and a second terminal that is for obtaining information of the external device; and a determination unit configured to determine a type of the external device based on a voltage value of the first terminal after a predetermined period elapses since the second control unit caused the resistance between the second terminal and the GND terminal to change, wherein the first control unit controls the power reception process in accordance with the type of the external device determined by the determination unit.

According to another aspect of the present invention, there is provided a method of controlling an electronic device provided with a first terminal for receiving power from a connected external device, a second terminal for obtaining information of the external device, and a GND terminal connected to the second terminal, the method comprising: causing a resistance between the second terminal and the GND terminal to change; and determining a type of the external device based on a voltage of the first terminal after causing the resistance to change.

According to another aspect of the present invention, there is provided a method of controlling an electronic device provided with a first terminal for receiving power from a connected external device, and a second terminal for obtaining information of the external device, the method comprising: changing a voltage of the second terminal from a voltage included in a predetermined range to a voltage outside of the predetermined range; and determining a type of the external device in accordance with a voltage of the first terminal after a predetermined period has elapsed since the voltage of the second terminal was changed to the voltage outside of the predetermined range.

According to another aspect of the present invention, there is provided a method of controlling a control apparatus for controlling a power reception process for receiving power from a connected external device via a first terminal, the method comprising: changing a resistance between a GND terminal and a second terminal that is for obtaining information of the external device; determining a type of the external device based on a voltage value of the first terminal after a predetermined period has elapsed since changing the resistance between the second terminal and the GND terminal; and controlling the power reception process in accordance with the determined type of the external device.

Further features of the present invention will become apparent from the following description of exemplary embodiments (with reference to the attached drawings).

BRIEF DESCRIPTION OF THE DRAWINGS

FIG. 4 is a block diagram illustrating an example of a configuration of the electronic device 100 according to a second embodiment.

DESCRIPTION OF THE EMBODIMENTS

Explanation of embodiments of the present invention is given below with reference to the attached drawings.

First Embodiment

Figure 1A:
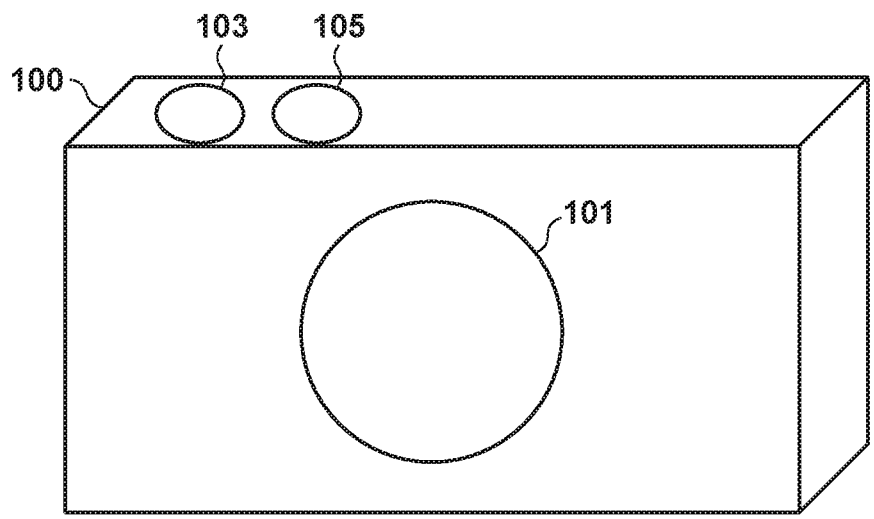
FIG. 1A and FIG. 1B are views illustrating an outer appearance of an image capturing apparatus as an example of an electronic device 100.
Figure 1B:
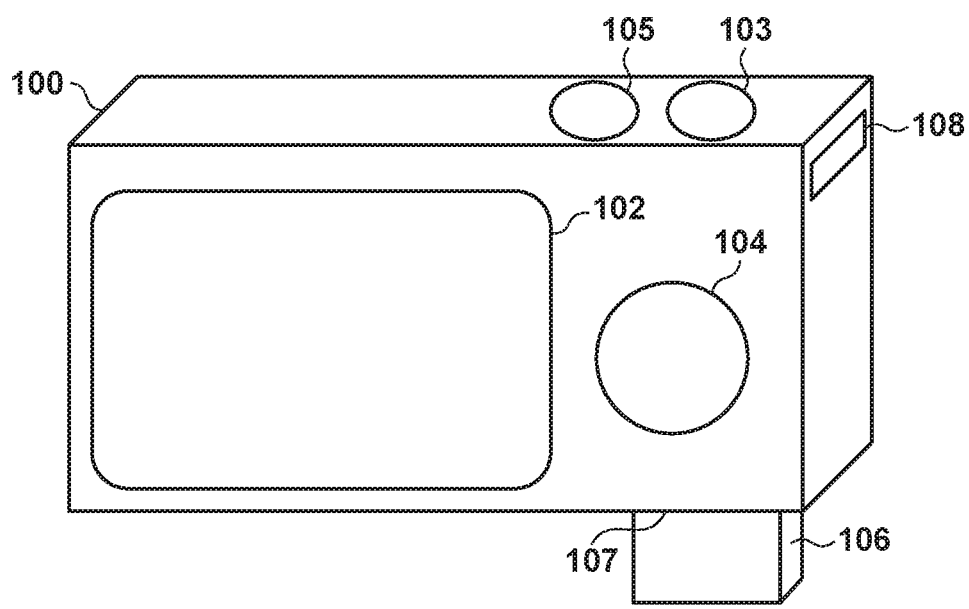

FIG. 1A and FIG. 1B are a view illustrating an outer appearance of an image capturing apparatus (a digital camera), as an example of an electronic device 100 that has a USB Type-C interface. Note that the electronic device 100 is not limited to an image capturing apparatus, and may be any device if it is a device that can use power of an external device connected via a predetermined interface, such as a handheld device. FIG. 1A is a view from a perspective of a front surface of the electronic device 100, and FIG. 1B is a view from a perspective of a back surface of the electronic device 100. An image capturing optical system 101 is equipped with a lens and a shutter, and causes a subject image to be formed on a light-receiving surface of an image capture element such as a CCD sensor. A display unit 102 displays an image or various information. The display unit 102 is configured by a liquid crystal display or the like, for example. A shutter button 103 is used for performing an image capturing instruction. An operation unit 104 is equipped with operation members such as a touch panel, a button, and various switches for accepting various operations from a user. A power supply switch 105 switches power on and power off for the electronic device 100. A battery apparatus 106 includes a chargeable battery, such as a lithium ion secondary battery. A battery connection unit 107 connects to the battery apparatus 106, and receives power provided by the battery apparatus 106.

Figure 2:
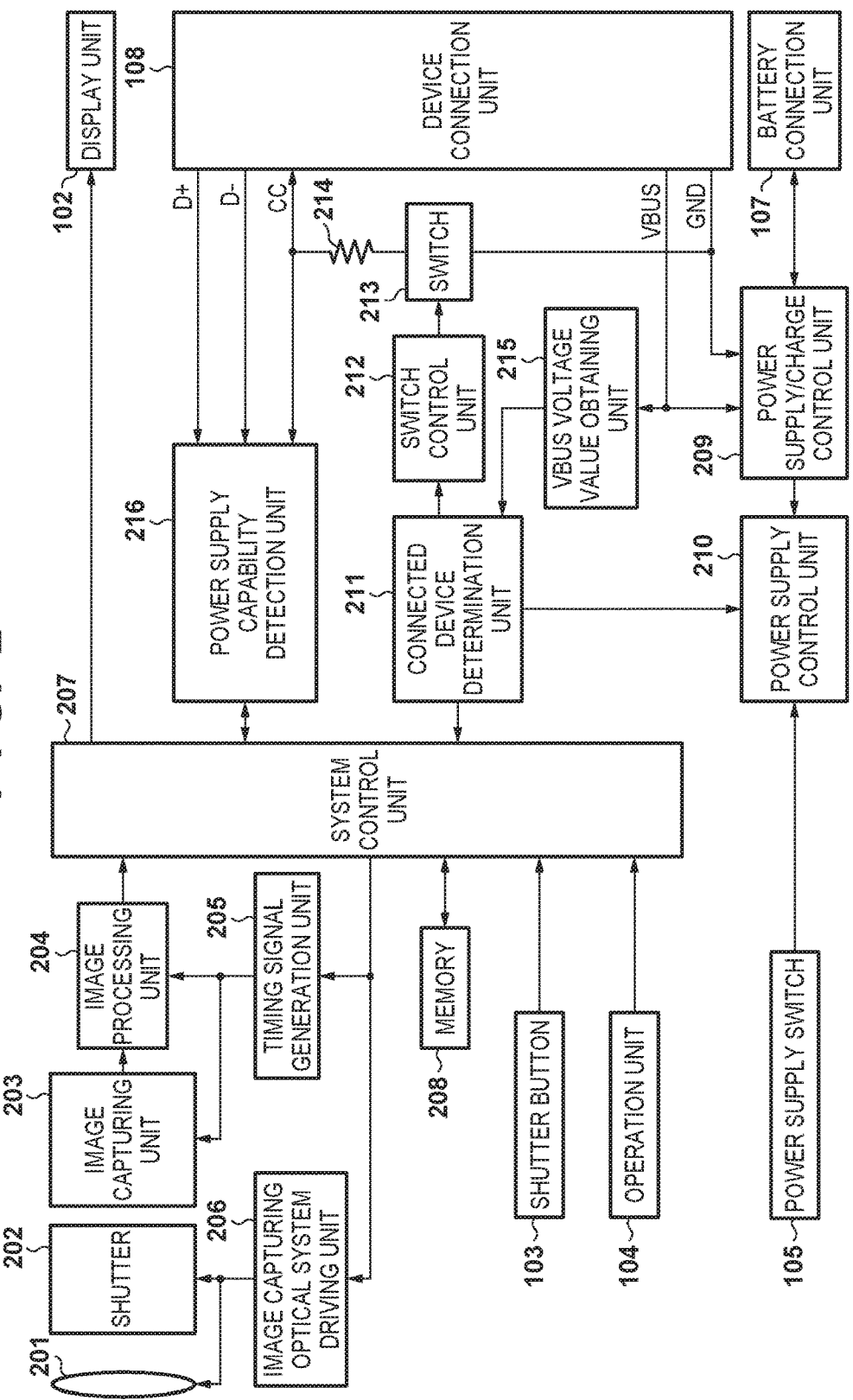
FIG. 2 is a block diagram illustrating an example of a configuration of the electronic device 100 according to a first embodiment.

A device connection unit 108 is an interface for an external device, and has a first terminal for receiving power from a connected external device, a second terminal that can receive power supply ability information, and a GND (ground) terminal. As such an interface, in the first embodiment an interface to which a USB Type-C cable can be connected is exemplified, and as illustrated in FIG. 2, the first terminal is VBUS, and the second terminal is a CC terminal. In addition, the device connection unit 108 has a D− terminal and a D+ terminal for performing data transmission by differential signals. In other words, the device connection unit 108 of the first embodiment is an interface that complies with USB Type-C.

FIG. 2 is a block diagram illustrating an example of a configuration of the electronic device 100 according to a first embodiment. In FIG. 2, a lens unit 201 and a shutter 202 configure the image capturing optical system 101. An image capturing unit 203 has a CCD sensor for example, and converts an optical image into an electrical signal. An image processing unit 204 has a correlated double sampling unit, a programmable gain amplification unit, and an analog-digital converter unit, and obtains digital image data from an output signal of the image capturing unit 203. The correlated double sampling unit performs correlated double sampling with respect to the output signal of the image capturing unit 203. The programmable gain amplification unit can be set to a desired degree of amplification, and amplifies an analog signal obtained from the correlated double sampling unit. The analog-digital converter unit converts the amplified analog signal into digital data. A timing signal generation unit 205 generates a signal for causing each of the image capturing unit 203 and the image processing unit 204 to operate. An image capturing optical system driving unit 206 causes each of the lens unit 201 and the shutter 202 to operate.

A system control unit 207 controls the electronic device 100 overall. An image signal from the image processing unit 204 is written to a memory 208 via the system control unit 207. The memory 208 stores image data that is obtained by the image capturing unit 203 and converted into digital data by the image processing unit 204, and image data to be display on the display unit 102. The memory 208 is provided with sufficient storage capacity for storing a predetermined number of still images, a moving image of a predetermined period, and audio. In addition, the memory 208 serves as a memory for image display (a video memory). The system control unit 207 superimposes predetermined data as necessary onto data for image display that is stored on the memory 208, and supplies a result thereof to the display unit 102. In this way, image data for display that is written to the memory 208 is displayed on the display unit 102 which is a display device such as a liquid crystal display.

The shutter button 103 and the operation unit 104 are instruction input members for inputting various operation instructions to the system control unit 207. In accordance with an operation midpoint signal—a so-called half press (shooting preparation instruction) signal—of the shutter button 103, the system control unit 207 starts a shooting preparation operation such as AF (auto focus) processing, AE (automatic exposure) processing, and AWB (auto white balance processing). In accordance with an operation complete signal—a so-called full press (image capturing instruction) signal—from the shutter button 103, the system control unit 207 starts an image capturing process operation from signal reading of the image capturing unit 203 to writing image data to a recording medium such as an SD card.

A power supply/charge control unit 209 supplies power of the battery apparatus 106, which is connected to the battery connection unit 107, to a power supply control unit 210. In addition, the power supply/charge control unit 209 can supply power to the power supply control unit 210 from an external device that receives power from the VBUS terminal of the device connection unit 108. Furthermore, the power supply/charge control unit 209 can charge the battery apparatus 106 that is connected to the battery connection unit 107, by power that is received from the VBUS terminal of the device connection unit 108. The power supply control unit 210 is supplied with power from the power supply/charge control unit 209, and supplies each unit, including the system control unit 207, with necessary power for a necessary period, based on an instruction from the power supply switch 105. In addition, irrespective of an instruction from the power supply switch 105, the power supply control unit 210 can supply power necessary for a connected device determination unit 211, a switch control unit 212, a switch 213, and a VBUS voltage value obtaining unit 215, which are described later.

A resistor 214 is connected between the USB Type-C CC terminal of the device connection unit 108 and the switch 213, and has a predetermined resistance. The switch 213 is connected between the resistor 214 and the GND terminal of the device connection unit 108, and can switch a conductive state and a non-conductive state between the resistor 214 and the GND terminal in accordance with control from the switch control unit 212. In other words, in accordance with cooperation between the switch control unit 212 and the switch 213, a function for causing a resistance (the resistor 214) connected between the CC terminal and the GND terminal to change is realized. In other words, between the CC terminal and the GND terminal the resistor 214 which has a predetermined resistance and the switch 213 which changes between a conductive state and a non-conductive state are connected in series, and the resistance between the CC terminal and the GND terminal is caused to change by changing between the conductive state and the non-conductive state of the switch 213. Note that, in the first embodiment, an initial state of the switch 213—in other words when there is no control from the switch control unit 212—is the conductive state. The VBUS voltage value obtaining unit 215 obtains voltage information of the VBUS terminal of the device connection unit 108, and conveys it to the connected device determination unit 211. The connected device determination unit 211 can obtain voltage information from the VBUS voltage value obtaining unit 215, perform a control instruction to the switch control unit 212, instruct the power supply control unit 210 to start power supply to a given unit, and convey connected device type information to the system control unit 207.

A power supply capability detection unit 216 is connected to the D− terminal, the D+ terminal, and the CC terminal of the device connection unit 108. The power supply capability detection unit 216 detects the power supply ability of an external device connected to the device connection unit 108 by detecting a CC terminal voltage, or by enumeration and/or a connection destination detection that uses the D+ terminal or the D− terminal. In addition, the power supply capability detection unit 216 is also capable of communication for USB Power Delivery that is supported by USB Type-C. The power supply capability detection unit 216 receives type information that indicates the type of a connected external device from the system control unit 207, and detects the power supply ability of the connected external device based on the type information and conveys it to the system control unit 207. Here, the type information indicates whether the connected external device is a Type-C device or a non-Type-C device. Note that, in the first embodiment, the connected device determination unit 211 conveys type information of a connected external device to the system control unit 207, and the system control unit 207 conveys the type information to the power supply capability detection unit 216. However, the connected device determination unit 211 may convey the type information to the power supply capability detection unit 216 without going through the system control unit 207. In such a case, irrespective of an instruction from the power supply switch 105, the power supply control unit 210 can supply power necessary for the connected device determination unit 211, the switch control unit 212, the switch 213, the VBUS voltage value obtaining unit 215, and the power supply capability detection unit 216.

Figure 3:
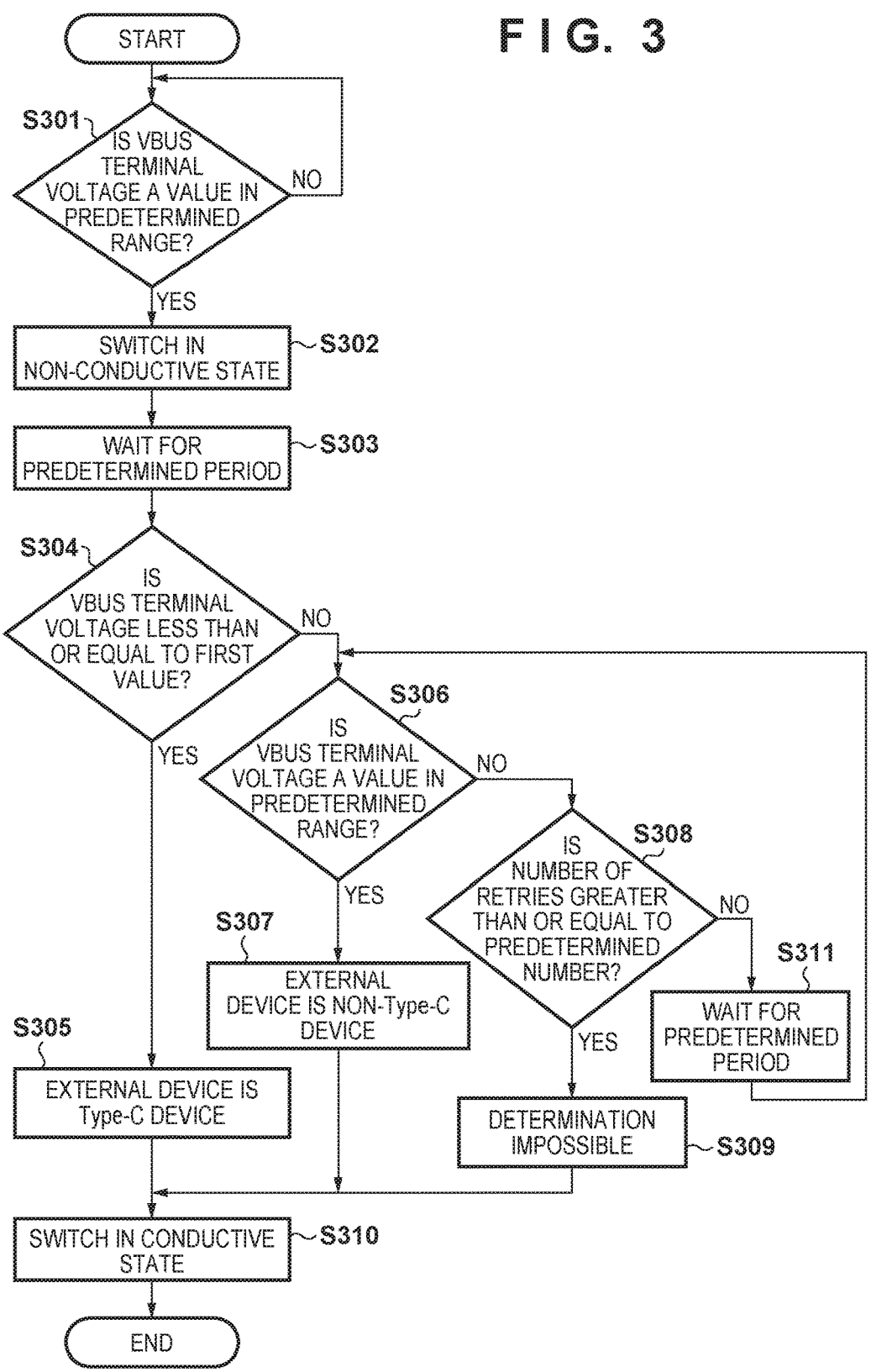
FIG. 3 is a flowchart illustrating an example of a control operation process by the electronic device 100 in the first embodiment.

FIG. 3 is a flowchart that illustrates an example of a control operation of the connected device determination unit 211 in a case where an external device is connected to the device connection unit 108 by a USB Type-C cable when main power is off in the electronic device 100 which is configured as described above. In FIG. 3, the connected device determination unit 211 refers to voltage information from the VBUS voltage value obtaining unit 215, and determines whether the VBUS terminal voltage is a value in a predetermined range (step S301). A value in the predetermined range is, for example, greater than or equal to 4.75V and less than or equal to 5.25V. The connected device determination unit 211, if the VBUS terminal voltage is not a value in the predetermined range (NO in step S301), returns the processing to step S301.

The connected device determination unit 211, if the VBUS terminal voltage is a value in the predetermined range (YES in step S301), executes a determination of the type of the external device. In the first embodiment, after causing the resistance between the CC terminal and the GND terminal to change, the connected device determination unit 211 determines the type of the external device by referring to a voltage value obtained by the VBUS voltage value obtaining unit 215 after a predetermined period has elapsed. A detailed processing example in accordance with a determination of the type of the external device by the connected device determination unit 211 is described below.

Firstly, a control instruction for making the switch 213 that is in a conductive state enter a non-conductive state is made with respect to the switch control unit 212 (step S302), and waiting for the predetermined period is performed (step S303). By making the switch 213 enter the non-conductive state, a state where the CC terminal is connected to the GND terminal by the resistor 214 which has a predetermined resistance changes to a non-connected state. In addition, the predetermined period by which waiting is performed in step S303 is, for example, greater than or equal to 650 msec, which is a t VBUS OFF maximum time of the USB Type-C specification. In addition, it is advantageous if the predetermined period is less than or equal to 1000 msec.

After waiting for the predetermined period, the connected device determination unit 211 refers to the voltage information from the VBUS voltage value obtaining unit 215, and determines whether the VBUS terminal voltage is less than or equal to a first value (step S304). If the connected external device is a Type-C device, output of the VBUS voltage will be stopped by the t VBUS OFF maximum time. Meanwhile, if the external device is a non-Type-C device, the VBUS voltage will be constantly outputted irrespective of the resistance between the CC terminal and the GND terminal. The first value is for example assumed to be 1.0V, in view of the capacitance between the VBUS terminal and the GND terminal. Note that it is desirable that charge that is stored at the capacitance between the VBUS terminal and the GND terminal is discharged during the waiting in step S303 that is before the determination of step S304. If the VBUS terminal voltage is less than or equal to the first value (YES in step S304), the connected device determination unit 211 determines that the connected external device is a Type-C device (step S305).

After waiting the predetermined period of step S303, if the VBUS terminal voltage is not less than or equal to the first value (NO in step S304), the connected device determination unit 211 determines whether the value of the VBUS terminal voltage is in the predetermined range (step S306). A value in the predetermined range is, for example, greater than or equal to 4.75V and less than or equal to 5.25V. If the VBUS terminal voltage is a value in the predetermined range (YES in step S306), the connected device determination unit 211 determines that the external device is a non-Type-C device (step S307). If the VBUS terminal voltage is not a value in the predetermined range (NO in step S306), the connected device determination unit 211 advances the processing to step S306, and executes retries until the number of retries is predetermined number (NO in step S308). In a retry the connected device determination unit 211 determines whether the VBUS terminal voltage is a value in the predetermined range after waiting the predetermined period (step S311). Note that the wait period of step S311 and the predetermined number are appropriately set so that time greater than or equal to that necessary for a determination is not taken. For example, if the wait period is set as 50 ms and the predetermined number is set as 6 so that the determination ends within 1 second (1000 ms), then together with the wait period of step S303 (650 ms) the processing for determining ends in approximately 900 ms. If the VBUS terminal voltage is not a value in the predetermined range even if a predetermined number of retries are performed (YES in step S308), the connected device determination unit 211 sets the type of the external device as determination impossible (step S309). When processing for determining the type as described above ends, the connected device determination unit 211 performs a control instruction to the switch control unit 212 to set the switch 213 which is in the non-conductive state to the conductive state (step S310), and this control operation ends.

By the aforementioned control operation, the connected device determination unit 211 can determine the type of an external device connected to the device connection unit 108, and for example, instruct the power supply control unit 210 to start power supply to the system control unit 207 and the power supply capability detection unit 216. When the connected device determination unit 211 conveys the type information indicating the type decided in step S305, in step S307, or in step S309 to the system control unit 207, the system control unit 207 conveys that type information to the power supply capability detection unit 216. The power supply capability detection unit 216 can appropriately detect a power supply ability of the external device based on the conveyed type information. Alternatively, configuration may be such that the connected device determination unit 211 stores the type information in a predetermined memory, and after the power supply control unit 210 has supplied power to each unit including the system control unit 207, the system control unit 207 obtains the type information from the predetermined memory. The power supply control unit 210 supplies power to each unit based on an instruction in accordance with the power supply switch 105.

Note that it is desirable for the aforementioned control operation to be executed before the power supply capability detection unit 216 performs communication for USB Power Delivery that is supported by USB Type-C. In addition, if it is determined in step S305 that the connected external device is a Type-C device, the power supply ability of the connected external device is detected in accordance with voltage information in accordance with the CC terminal, or a data transmission in accordance with the CC terminal. In contrast, if it is determined in step S307 that the connected external device is a non-Type-C device, the power supply ability of the external device is detected in accordance with enumeration that uses the D+ terminal and the D− terminal, and/or a connection destination detection that uses the D+ terminal and the D− terminal.

Note that, if type information indicating that the type of the external device cannot be determined is conveyed from the connected device determination unit 211, the system control unit 207 controls so as to not use power supplied from the external device, for example. Alternatively, it is possible to consider the system control unit 207 making an instruction to the power supply capability detection unit 216 to confirm the power supply ability of the external device in communication by the CC terminal or the D+ terminal and the D− terminal. In the first embodiment, a control operation in the case where the system control unit 207 has obtained information indicating that the type of the external device cannot be determined is not limited.

As described above, the electronic device 100 of the first embodiment can correctly recognize and manage usable power by detecting whether a connected external device is a Type-C device or a non-Type-C device. Accordingly, it is possible to reliably perform an operation in accordance with the power supply ability of the external device, charging of a battery apparatus in accordance with the power supply ability of the external device, or the like. Accordingly, the power supply ability of an external device being misjudged and power greater than the actual power supply ability being used, and operation going down are prevented. Note that, in the aforementioned embodiment, an image capturing apparatus was exemplified as the electronic device 100, but of course there is no limitation to this. It may be any device if it is an electronic device that implements a USB Type-C interface.

Second Embodiment

Next, explanation is given for a second embodiment. In the first embodiment, power necessary for the connected device determination unit 211, the switch control unit 212, the switch 213, and the VBUS voltage value obtaining unit 215 to operate is supplied from the battery apparatus 106 which is connected to the battery connection unit 107. Accordingly, when the power storage amount of the battery apparatus 106 is low, or when the battery apparatus 106 is not connected, it is not possible to perform the control operation of FIG. 3. Accordingly, in the electronic device according to the second embodiment, execution of the control operation corresponding to FIG. 3 is possible even if the power storage amount of the battery apparatus 106 is low or if the battery apparatus 106 is not connected. Note that, the electronic device 100 having the same configuration as that in the first embodiment is exemplified as an example of an electronic device in the second embodiment as well. An outer appearance of the electronic device 100 of the second embodiment is the same as that of the first embodiment (FIG. 1A, FIG. 1B).

FIG. 4 is a block diagram illustrating an example of a configuration of the electronic device 100 according to a second embodiment. The same reference numerals are added to the same configurations as those illustrated in the first embodiment (FIG. 2). In FIG. 4, a power storage unit 401 is configured by a regulator that is inputted with the VBUS voltage and outputs 3.3V, and a 4.7 OF capacitor that is charged by the regulator output. In such a case, for example when the charging current is 1 mA, a charge of 15.5 μC is stored in the capacitor in 15.5 msec. The power storage unit 401 can use the stored charge to supply power necessary for the connected device determination unit 211, the switch control unit 212, the switch 213, the VBUS voltage value obtaining unit 215, and a power storage state detection unit 402 to operate. For example, assuming that an input power supply voltage that enables each unit receiving a supply of power from the power storage unit 401 to operate is 3.3V to 1.8V, and a total current consumption is 5 μA, operation for approximately 1400 msec is possible ((15.5 μC−(4.7 μF×1.8V))/5 μA≈1400 ms). The power storage state detection unit 402 for example detects a power storage state of the power storage unit 401 based on a voltage value of the power storage unit 401, and conveys obtained information to the connected device determination unit 211.

Figure 5:
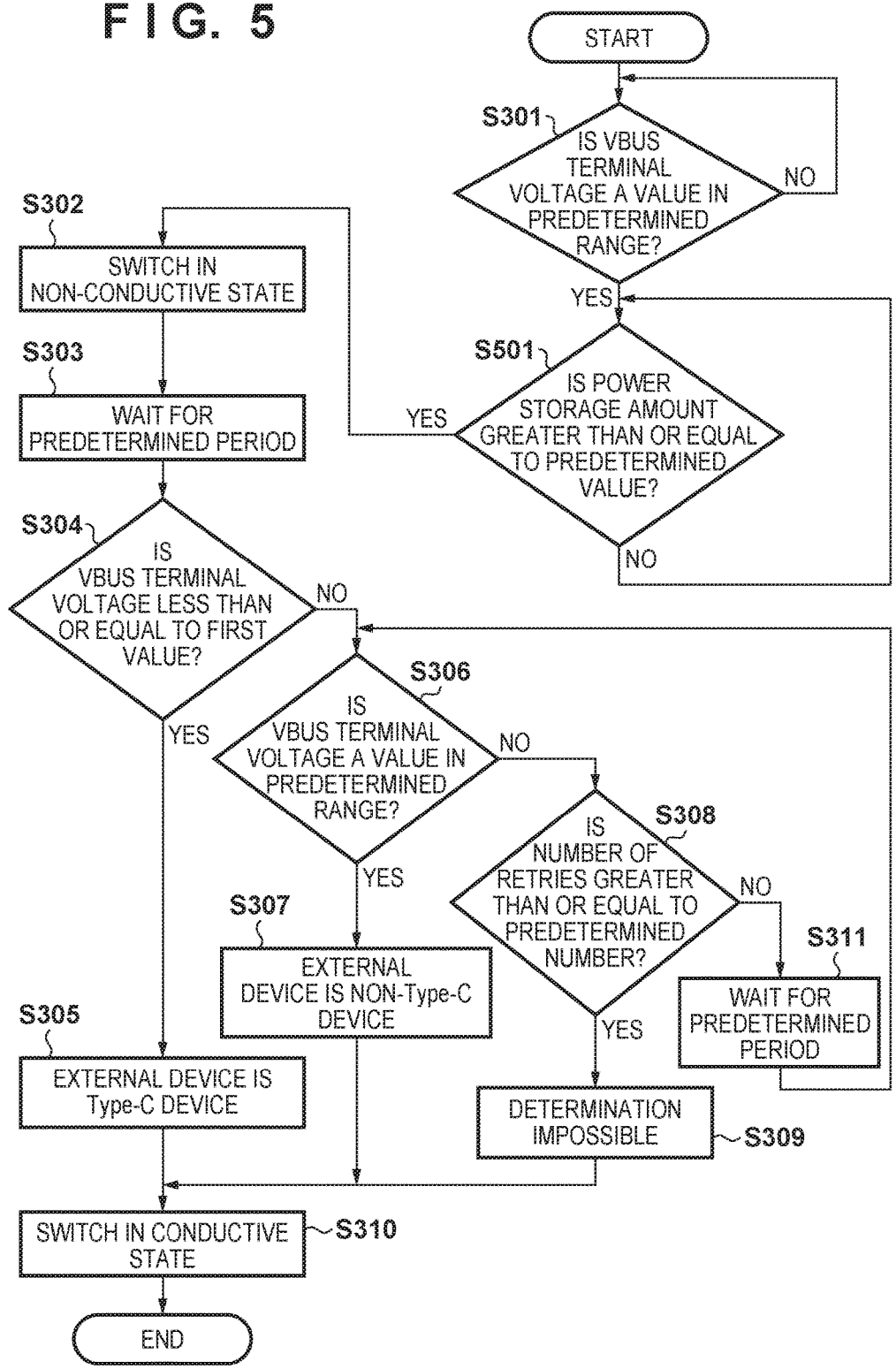
FIG. 5 is a flowchart illustrating an example of a control operation process by the electronic device 100 in the second embodiment.

FIG. 5 is a flowchart that illustrates an example of a control operation of the connected device determination unit 211 in a case where an external device is connected to the device connection unit 108 by a USB Type-C cable when main power is off in the electronic device 100 according to the second embodiment which is configured as described above. In FIG. 5, the connected device determination unit 211, which has started operation after being supplied with power from the power storage unit 401, refers to voltage information from the VBUS voltage value obtaining unit 215, and determines whether the VBUS terminal voltage is a value in a predetermined range (step S301). A value in the predetermined range is, for example, greater than or equal to 4.75V and less than or equal to 5.25V. The connected device determination unit 211, if the VBUS terminal voltage is not a value in the predetermined range (NO in step S301), returns the processing to step S301. If the VBUS terminal voltage is a value in the predetermined range (YES in step S301), the connected device determination unit 211 confirms with the power storage state detection unit 402 whether a power storage amount of the power storage unit 401 is greater than or equal to a predetermined value (step S501). In the second embodiment, the predetermined value is for example 14 μC, which is approximately 90% of 15.5 μC. Under the conditions as described above, if the power storage amount is 14 μC, operation over approximately 1100 ms is possible (((14 μC−(4.7 μF×1.8V))/5 μA≈1100 ms)).

The connected device determination unit 211, if the power storage amount of the power storage unit 401 is not greater than or equal to the predetermined value (NO in step S501), returns the processing to step S501. In this way, the connected device determination unit 211 waits for the power storage amount of the power storage unit 401 to become greater than or equal to the predetermined value (14 μC). If the power storage amount of the power storage unit 401 is greater than or equal to the predetermined value (YES in step S501), the connected device determination unit 211 performs a control instruction with respect to the switch control unit 212 for making the switch 213 which is in a conductive state enter a non-conductive state (step S302), and waits a predetermined period (step S303). Subsequent control operations are similar to processing illustrated in FIG. 3 (step S304 through step S310). However, there is a necessity for number of retries in the case of NO in step S308 as well as the wait period in step S311 to be set so that processing ends within a period in which operation is possible. As exemplified in the first embodiment, for example if the wait period is 50 ms and the predetermined number is 6, processing for determining will end by 900 ms. Accordingly, processing for determining will end within the aforementioned operation period of 1100 ms.

By making the switch 213 enter the non-conductive state in step S302, a state where the CC terminal is connected to the GND terminal by the resistor 214 of a predetermined resistance changes to a non-connected state. If the connected external device is a Type-C device, output of the VBUS voltage will be stopped by the t VBUS OFF maximum time (650 ms). Hypothetically if power necessary for the connected device determination unit 211, the switch control unit 212, the switch 213, the VBUS voltage value obtaining unit 215, and the power storage state detection unit 402 to operate is supplied from VBUS of an external device, operation stops at this point. Accordingly, the connected device determination unit 211 confirms in step S501 whether enough charge to enable power necessary for operation from at the least step S302 where the switch 213 is set to the non-conductive state until step S310 where the switch 213 is set to the conductive state to be supplied has been stored in the power storage unit 401.

Accordingly, it is sufficient if the power storage unit 401 can supply the power as described above, and the power storage unit 401 is not limited to the aforementioned configuration. For example, the power storage unit 401 is configured by a regulator that is inputted with the VBUS voltage and outputs 3.3V, and a 4.7 µF capacitor that is charged by the regulator output, but configuration may be taken such that a capacitor is directly charged by the VBUS voltage. In addition, the capacitor of the power storage unit 401 is not limited to the above overview, and it is sufficient if it is a capacitor that can store charge that enables power necessary for operation from at the least step S302 where the switch 213 is set to the non-conductive state until step S310 where the switch 213 is set to the conductive state to be supplied. Furthermore, a device that can store charge other than a capacitor, for example a secondary battery, may be used in place of the capacitor in the power storage unit 401. Accordingly, the battery apparatus 106 which is connected to the battery connection unit 107 may be used as the capacitor of the power storage unit 401. In the second embodiment, the configuration of the power storage unit 401 is not limited whatsoever.

Therefore, the electronic device 100 according to the second embodiment can detect the device type—Type-C device or non-Type-C device—for a connected external device, even if the power storage amount of the battery apparatus 106 is low or if the battery apparatus 106 is not connected. Accordingly, it is possible to detect whether an external device is a Type-C device or a non-Type-C device without depending on energy from a battery apparatus, and it is possible to correctly manage power that is used. As a result, operation according to the power supply ability of the external device and charging of an attached battery apparatus become possible. Accordingly, the power supply ability of an external device being misjudged and power greater than the actual power supply ability being used, and operation going down are prevented.

Note that, in the above first and second embodiments, processing illustrated in FIG. 3 and FIG. 5 is executed in accordance with connection of an external device when the main power of the electronic device 100 is off. However, similar control operations are possible even if the main power of the electronic device 100 is on.

Third Embodiment

Next, explanation is given for a third embodiment. In the second embodiment, power from a VBUS terminal that is a terminal for supplying power was used to charge the power storage unit 401, and used as power for determination of a connected device. In the third embodiment, configuration is such that power from a CC terminal that is a terminal for a signal is used to accumulate power that can be used for a determination of a type of a connected device, and the accumulated power can be used when voltage from the VBUS terminal disappears.

Figure 6:
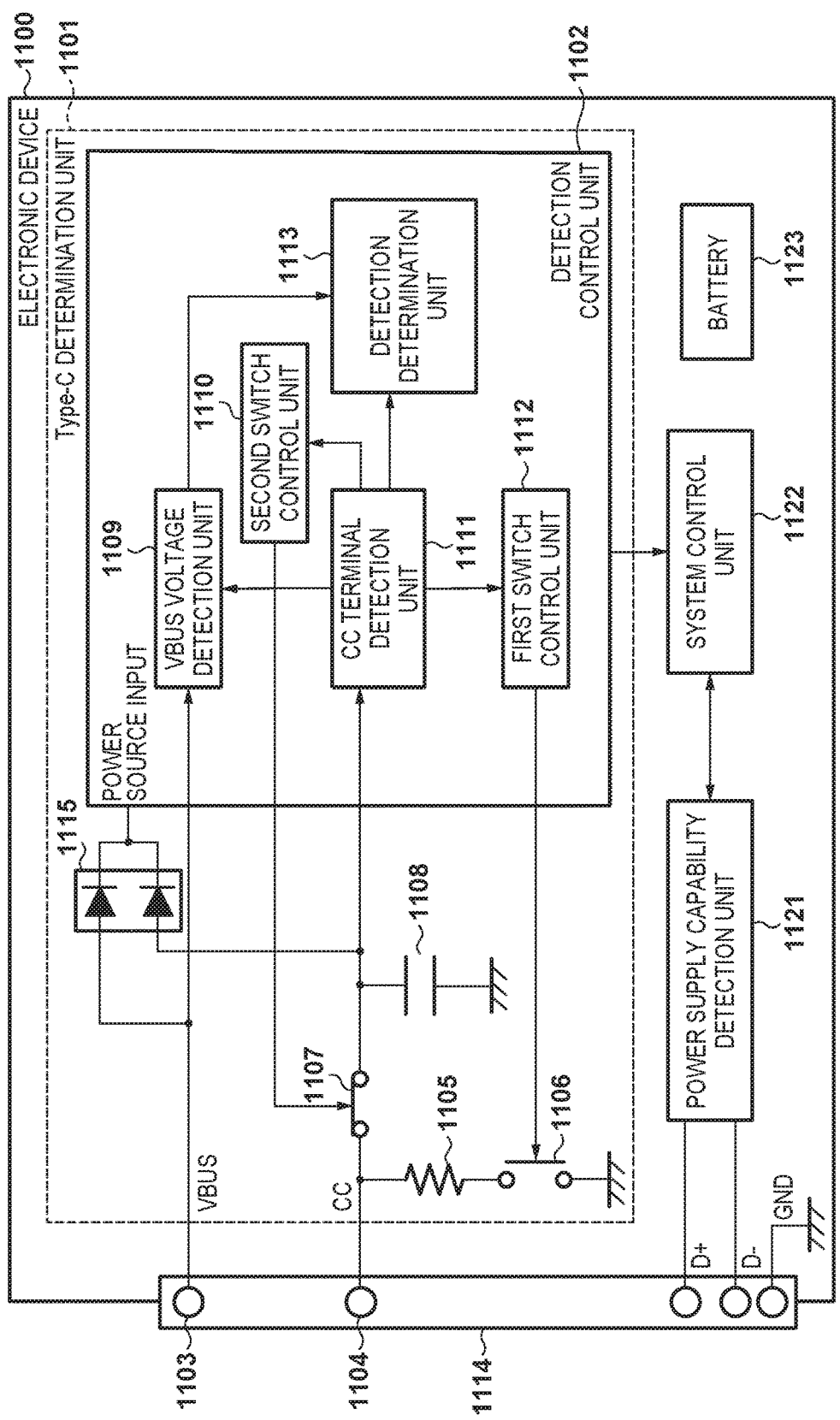
FIG. 6 is a block diagram illustrating an example of a configuration of the electronic device according to a third embodiment.

Firstly, with reference to FIG. 6, explanation is given for a configuration of an electronic device 1100 of the third embodiment. Similar to the embodiments described above, the electronic device 1100 may be any device if it is a device that can use power from an external device that is connected via a predetermined interface, such as a digital camera or a handheld device, for example. In FIG. 6, in particular detailed illustration is given for a configuration for determining whether an external device connected to the electronic device 1100 is a Type-C device. The electronic device 1100 is a sink device that can be supplied with power via a USB cable from an external device (not shown) that is connected to a Type-C connector 1114 that is an interface. In addition, the external device connected to the Type-C connector 1114 of the electronic device 1100 functions as a source device. The electronic device 1100 of the third embodiment determines whether the external device is a Type-C device in accordance with the connection of the external device, and switches a method of detecting the power supply ability of the external device in accordance with the determination result.

In FIG. 6, a Type-C determination unit 1101 determines whether or not the external device connected to the Type-C connector 1114 is a Type-C device. A power supply capability detection unit 1121 detects the power supply ability of the external device based on the states of a D+ terminal, a D− terminal, and a CC terminal 1104. A system control unit 1122 has a CPU and a memory (not shown), and various control in the electronic device 1100 is realized by the CPU executing a program stored in the memory. In accordance with a determination result by the Type-C determination unit 1101 (a determination result of whether the external device is a Type-C device), the system control unit 1122 switches a power supply ability detection method used by the power supply capability detection unit 1121, which detects the power supply ability of the external device. A battery 1123 supplies power to each unit of the electronic device 1100.

In the Type-C connector 1114, a VBUS terminal 1103 is a terminal for receiving power from the connected external device. The CC terminal 1104 is a Configuration Channel in USB Type-C. If the connected external device is a Type-C device, it is possible to obtain power supply ability information of the external device by identifying the state of the CC terminal 1104. Note that, in Type-C, to identify the front and back and of a connected cable, two CC terminals are present, and one becomes a valid CC terminal in accordance with how the cable is connected. Accordingly, there are actually two configurations regarding CC terminals. In the present embodiment, to make the explanation easier to understand, explanation is given to a CC terminal that becomes valid when a cable is connected. In addition, the Type-C connector 1114 has a ground terminal (a GND terminal) for providing a ground, and a D– terminal and a D+ terminal for transmitting differential signals.

Next, explanation is given regarding the Type-C determination unit 1101. A pull-down resistor 1105 is connected to the CC terminal 1104, and pulls down the CC terminal 1104 to the ground provided by the GND terminal or the electronic device 1100. A first switch 1106 switches, in accordance with control by a first switch control unit 1112, a state in which the pull-down resistor 1105 is connected to the ground, and a state in which the pull-down resistor 1105 is disconnected from the ground. The first switch 1106 and the first switch control unit 1112 are an example of a configuration for causing a connection state through a resistor between the CC terminal 1104 and the ground to change. In accordance with control by a second switch control unit 1110, a second switch 1107 switches connection and disconnection among the CC terminal 1104, a power storage unit 1108, and a detection control unit 1102. The power storage unit 1108 is connected to the CC terminal 1104 through the second switch 1107, and stores power from the CC terminal 1104. The power storage unit 1108 is configured by a capacitor, for example. The power storage unit 1108 can supply power to the detection control unit 1102, through a power supply selector 1115. The power supply selector 1115 supplies the detection control unit 1102 with power having the highest voltage out of power supplied by the power storage unit 1108 and the VBUS terminal 1103. Accordingly, the detection control unit 1102 can operate by either of power stored in the power storage unit 1108 or power supplied from the VBUS terminal 1103.

The detection control unit 1102 includes a VBUS voltage detection unit 1109, the second switch control unit 1110, a CC terminal detection unit 1111, the first switch control unit 1112, and a detection determination unit 1113. The VBUS voltage detection unit 1109 is connected to the VBUS terminal 1103, and detects a voltage supplied to the VBUS terminal 1103 from the connected external device. The second switch control unit 1110 controls the second switch 1107 to control connection/disconnection among the CC terminal 1104, the power storage unit 1108, and the detection control unit 1102. The CC terminal detection unit 1111 is connected to the CC terminal 1104 through the second switch 1107, and detects a state (for example a voltage) of the CC terminal 1104. The first switch control unit 1112 controls the first switch 1106 to switch connection/disconnection with respect to ground via the pull-down resistor 1105 of the CC terminal 1104. The detection determination unit 1113 is connected to the VBUS voltage detection unit 1109 and the CC terminal detection unit 1111. The detection determination unit 1113 determines whether the connected external device is a Type-C device based on states of the CC terminal 1104 and the VBUS terminal 1103 that are detected by the CC terminal detection unit 1111 and the VBUS voltage detection unit 1109.

Figure 8A:
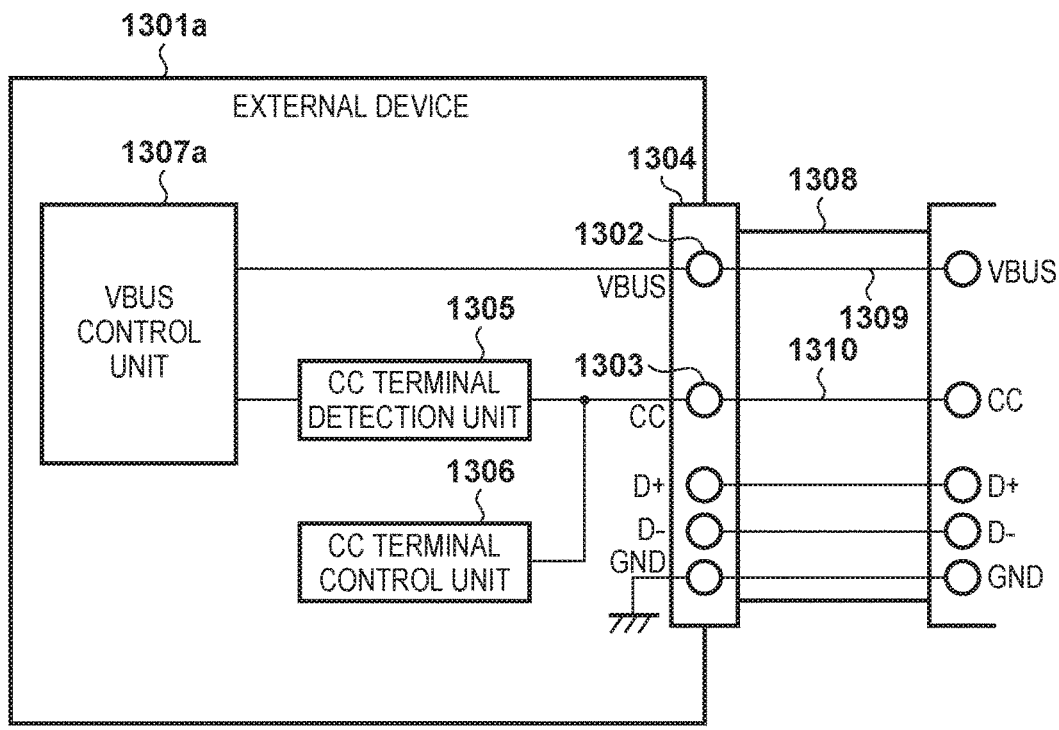
FIG. 8A and FIG. 8B are block diagrams of an interface unit of an external device.
Figure 8B:
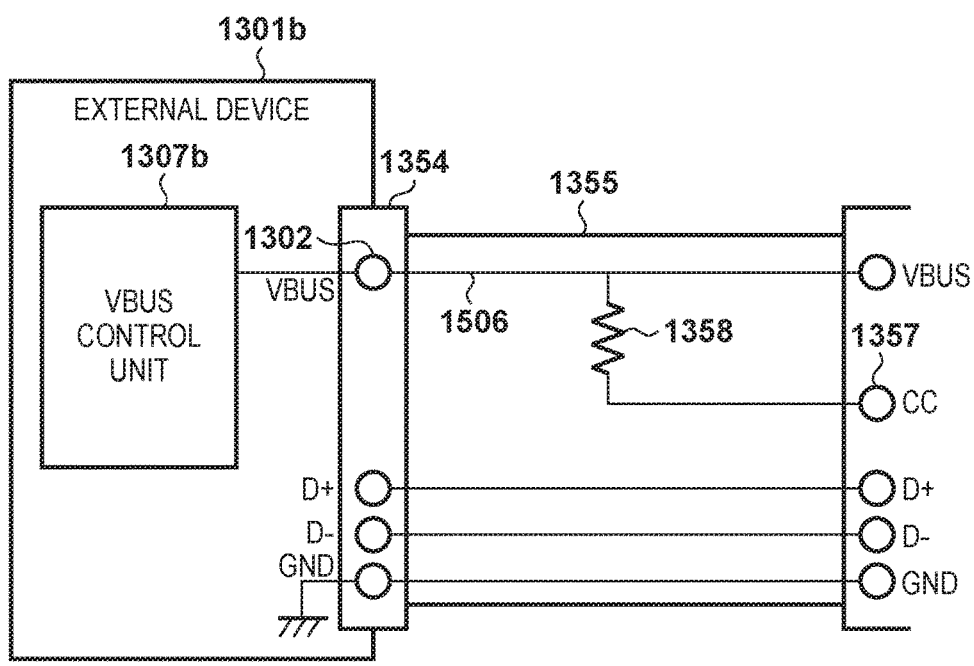

Next, using FIG. 8A and FIG. 8B, explanation is given regarding an external device 1301 that supplies power through a USB VBUS line and is connected to the electronic device 1100. FIG. 8A illustrates an external device 1301a that is a Type-C device, and FIG. 8B illustrates an external device 1301b that is a non-Type-C device.

The external device 1301a illustrated in FIG. 8A is a Type-C device, is connected to the electronic device 1100 via an interface that complies with Type-C, and operates as a source device that supplies power to the connected electronic device 1100. In a Type-C connector 1304, a VBUS terminal 1302 is a terminal for supplying power to the connected electronic device 1100. A CC terminal 1303 is a Configuration Channel terminal in the Type-C connector 1304. Furthermore, the Type-C connector 1304 includes a GND terminal that is connected to ground, and a D– terminal and a D+ terminal for signal transmission.

A CC terminal detection unit 1305 is connected to the CC terminal 1303, and detects a state of the CC terminal 1303. A CC terminal control unit 1306 is connected to the CC terminal 1303, and controls a state of the CC terminal 1303. A VBUS control unit 1307a is connected to the CC terminal detection unit 1305, and controls an output state of the VBUS terminal 1302 in accordance with a result of a detection by the CC terminal detection unit 1305. Regarding control of the output state, explanation is given later in accordance with the flowchart of FIG. 9. A Type-C cable 1308 is a cable where both ends have a connector that complies with a Type-C standard, and is for connecting Type-C devices to one another. A VBUS line 1309 included in the Type-C cable 1308 transmits a VBUS output. A CC line 1310 included in the Type-C cable 1308 transmits a CC signal. Note that, in FIG. 8A, portions necessary for the explanation of the third embodiment out of a configuration regarding a Type-C interface of the external device 1301a are extracted and illustrated, and a system control unit (CPU, memory), and the like are omitted.

FIG. 8B is a block diagram for illustrating an example of a configuration of the external device 1301b which does not comply with Type-C. In FIG. 8B, similarly to in FIG. 8A, portions necessary for the explanation of the third embodiment out of the configuration in relation to the Type-C interface of the external device are extracted and illustrated. Note that, in FIG. 8B, the same reference numeral is added to configurations that are the same as those in FIG. 8A.

The external device 1301b is a non-Type-C source device that can supply power through a USB VBUS terminal connected to the electronic device 1100. A non-Type-C connector 1354 may be for example a Type-A connector defined by a USB standard. The CC terminal 1303 is not present in the non-Type-C connector 1354 on the side that connects to the external device 1301b. In addition, the VBUS control unit 1307b always outputs the VBUS signal to the VBUS terminal 1302 while the external device 1301b is operating. A cable 1355 is a USB cable that has the aforementioned non-Type-C connector 1354 (for example Type-A) on the side connected to the external device 1301b, and has a Type-C connector on the other side (the side connected to the electronic device 1100). A CC terminal 1357 is present on the Type-C connector side. The CC terminal 1357 is pulled up to a VBUS line 1506 by a pull-up resistor 1358. Accordingly, voltages are always supplied to the CC terminal and the VBUS terminal of the Type-C connector that is connected to the external device 1301b which is a non-Type-C device. Note that, in such a cable, the resistance of the pull-up resistor 1358 is typically 56 kΩ.

Figure 9:
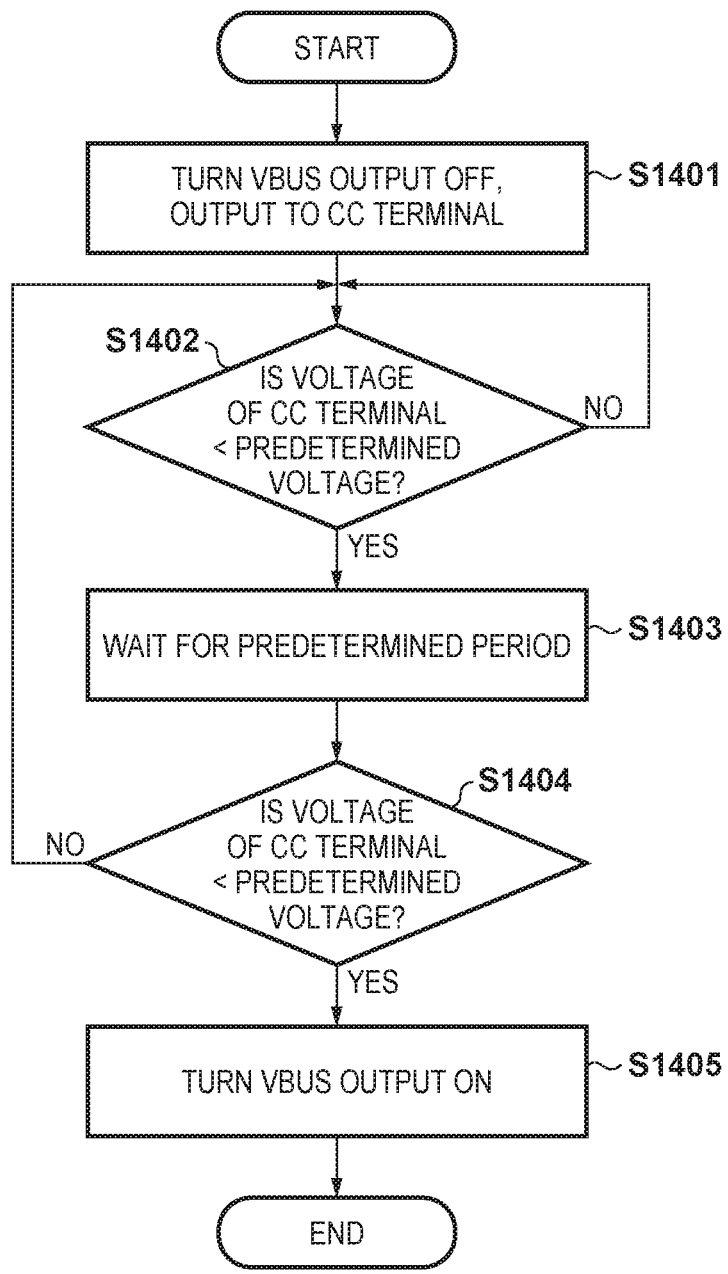
FIG. 9 is a flowchart illustrating processing of a VBUS output of an external device.

Next, the flowchart of FIG. 9 is used to explain operation (control for supply of the VBUS voltage in accordance with the state of the CC terminal) of the external device 1301a which is a Type-C device. In step S1401, the VBUS control unit 1307a turns output to the VBUS terminal 1302 off, and the CC terminal control unit 1306 outputs a voltage to the CC terminal 1303. Note that, a signal that the CC terminal control unit 1306 outputs to the CC terminal 1303 may be a signal defined in the USB standard "Universal Serial Bus Type-C Cable and Connector Specification Revision 1.1", for example. In accordance with this specification, in detail, output of the CC terminal 1303 is controlled as follows.

If the source device (the external device 1301) is capable of a power supply of 1.5 A and 5V through the VBUS terminal 1302, the CC terminal control unit 1306 either pulls up the CC terminal 1303 to 5V by 22 kΩ or pulls up the CC terminal 1303 to 3.3V by 12 kΩ.

If the source device (the external device 1301) is capable of a power supply of 3.0 A and 5V through the VBUS terminal 1302, the CC terminal control unit 1306 either pulls up the CC terminal 1303 to 5V by 10 kΩ or pulls up the CC terminal 1303 to 3.3V by 4.7 kΩ.

In step S1402, the VBUS control unit 1307a uses the CC terminal detection unit 1305 to monitor the state of the CC terminal 1303, and upon detecting that the voltage of the CC terminal 1303 is less than a predetermined voltage, advances the processing to step S1403. Meanwhile, if a voltage lower than the predetermined voltage is not detected in step S1402 by the CC terminal detection unit 1305, the VBUS control unit 1307a continues monitoring until a state is entered in which the voltage of the CC terminal 1303 is less than the predetermined voltage.

In accordance with the aforementioned specification, the CC terminal 1303 is pulled up to 5V by 22 kΩ or 10 kΩ, or pulled up to 3.3V by 12 kΩ or 4.7 kΩ. Accordingly, if the voltage of the CC terminal 1303 is maintained at a state of 5V or 3.3V, the VBUS control unit 1307a continues to monitor the state of the CC terminal 1303 in accordance with the CC terminal detection unit 1305.

In addition, as the predetermined voltage used in step S1402, the following values can be used in accordance with the stipulations in the aforementioned specification, for example.

1. .60V if supply of 1.5 A and 5V is possible through the VBUS terminal 1302 from the external device 1301 (a source device).
2. .60V if supply of 3.0 A and 5V is possible through the VBUS terminal 1302 from the external device 1301 (a source device).

Upon detecting that the voltage of the CC terminal 1303 is less than the predetermined voltage, in step S1403, the VBUS control unit 1307a waits for a predetermined period. After waiting, in step S1404, the VBUS control unit 1307a uses the CC terminal detection unit 1305 to reconfirm whether the voltage of the CC terminal 1303 is less than the predetermined voltage. This processing is the same as that of step S1402. Note that, as the predetermined period in step S1403, 100 ms is defined by the aforementioned specification, and this period is used in the third embodiment. By waiting 100 ms, even if the voltage of the CC terminal has momentarily become lower than the predetermined voltage due to noise or the like, the voltage of the CC terminal will be determined to be higher than the predetermined voltage by checking the voltage of the CC terminal again. In this way, an incorrect detection due to noise is prevented.

In step S1404, upon detecting that the voltage of the CC terminal 1303 is lower than the predetermined voltage, the VBUS control unit 1307a advances the processing to step S1405. Meanwhile, upon detecting that the voltage of the CC terminal 1303 is greater than or equal to the predetermined voltage in step S1404, the VBUS control unit 1307a returns the processing to step S1402. In step S1405, the VBUS control unit 1307a outputs a voltage to the VBUS terminal 1302. Note that, by the aforementioned specification, it is stipulated that a period from when the voltage of the CC terminal is detected to be lower than the predetermined voltage until output of a voltage to VBUS must be 275 ms or less. Accordingly, in the external device 1301a, when it is confirmed in step S1404 that the voltage of the CC terminal is less than the predetermined voltage, supply of a voltage to the VBUS terminal 1302 is started within 275 ms.

Figure 7:
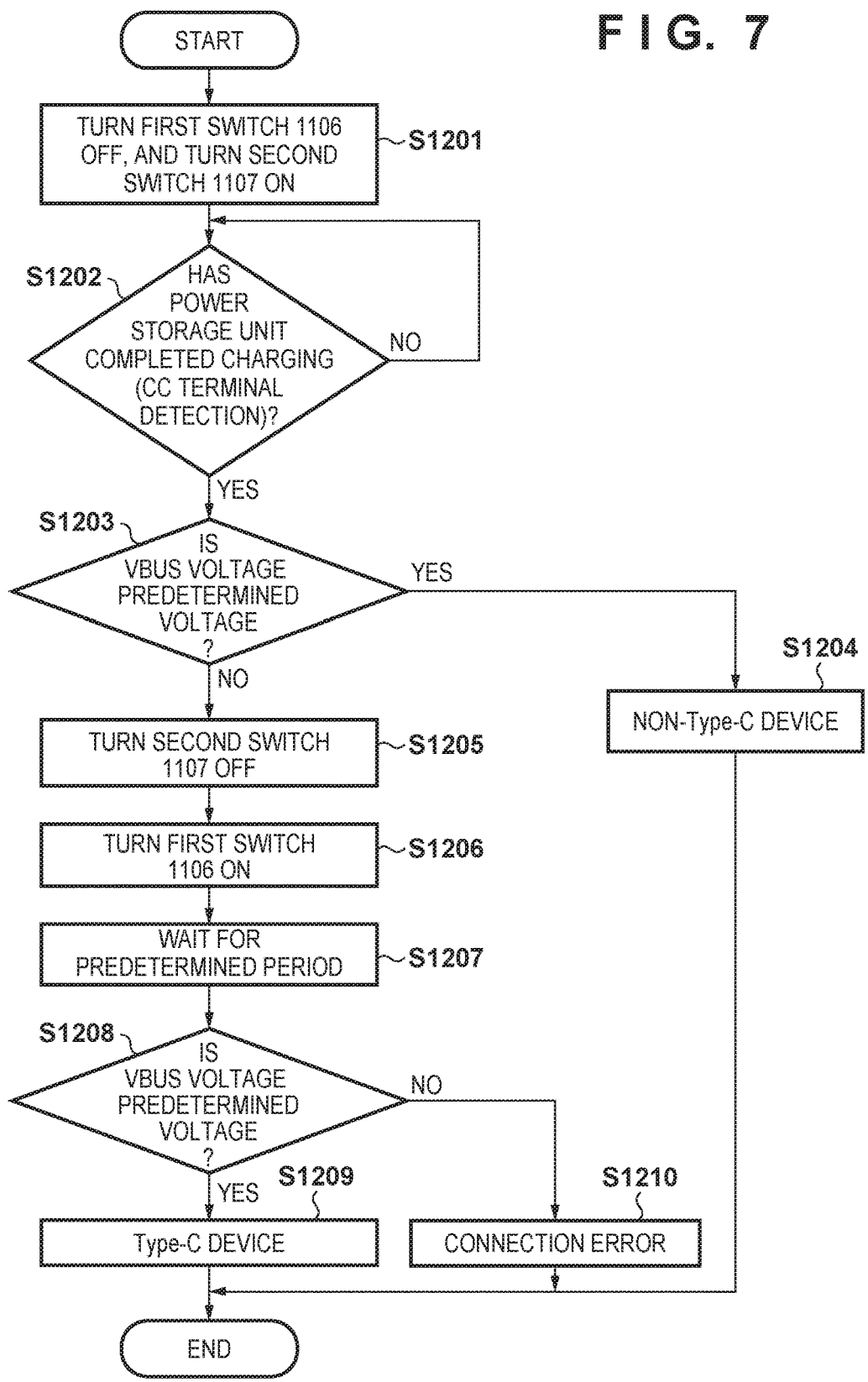
FIG. 7 is a flowchart illustrating the processing for determining a type of an interface according to a third embodiment.

Next, using the flowchart of FIG. 7, explanation is given for the operation of the electronic device 1100 (a sink device) that is supplied with power via the USB VBUS terminal from the connected external device. The electronic device 1100 determines whether or not the external device is a Type-C device by using power obtained from the CC terminal and the VBUS control procedure (VBUS output control in accordance with the state of the CC terminal) described above in accordance with FIG. 9 which is performed by the external device 1301a which is the Type-C device.

In step S1201, the first switch control unit 1112 turns the first switch 1106 off, and the second switch control unit 1110 turns the second switch 1107 on. This state (where the first switch 1106 is off and the second switch 1107 is on) is an initial state of the Type-C determination unit 1101 at a power off time for the electronic device 1100. It is assumed that this initial state is maintained in a state where the external device 1301 is not connected to the Type-C connector 1114 even after power is supplied (after power on). In addition, configuration may be taken such that, when the detection control unit 1102 detects that an external device has been connected via a USB cable to the Type-C connector 1114, step S1201 is executed, and the first switch 1106 and the second switch 1107 are caused to transition to the aforementioned initial state.

When a source device is connected to the Type-C connector 1114 by using a USB cable, when connected, a voltage is supplied to only the CC terminal 1104 if the source device is a Type-C device as in FIG. 8A. In addition, if the source device is a non-Type-C device as in FIG. 8B, voltages are supplied to both of the CC terminal 1104 and the VBUS terminal 1103 from the time of connection. If a voltage is only supplied to the CC terminal 1104, charge starts to be accumulated in the power storage unit 1108 via the second switch 1107, and when an accumulated amount reaches a predetermined amount or more, the detection control unit 1102 starts operation. Meanwhile, when voltages are supplied to the CC terminal 1104 and the VBUS terminal 1103, charge starts to be accumulated in the power storage unit 1108, but the detection control unit 1102 starts operation when a voltage is supplied to the VBUS terminal 1103.

When the detection control unit 1102 starts operation, in step S1202, the CC terminal detection unit 1111 determines whether power storage by the power storage unit 1108 has completed in accordance with monitoring of the voltage of the power storage unit 1108 (the voltage of the CC terminal 1104). When the voltage of the power storage unit 1108 becomes greater than or equal to a predetermined voltage, it is determined that power storage by the power storage unit 1108 has completed, and the processing transitions from step S1202 to step S1203. For example, when the voltage of the power storage unit 1108 reaches 3.0V, it is determined that charging has completed. In the external device 1301, when the CC terminal 1303 is pulled up to 3.3V by 12 kΩ, and the power storage unit 1108 is configured by a 2.2 μF capacitor, it takes a period of approximately 62 ms for the power storage unit 1108 to reach 3.0V.

Next, in step S1203, the detection determination unit 1113 confirms whether the VBUS voltage detection unit 1109 is detecting a predetermined voltage (5V) at the VBUS terminal 1103. Here, when the voltage of the VBUS terminal 1103 is detected by the VBUS voltage detection unit 1109, the processing transitions from step S1203 to step S1204. In step S1204, the detection determination unit 1113 determines that the connected source device is a non-Type-C device. As explained in accordance with FIG. 8B, this is because a voltage is constantly outputted to the VBUS terminal 1302 in a non-Type-C device.

In contrast, in step S1203 if the detection determination unit 1113 does not detect the predetermined voltage at the VBUS terminal 1103, the processing transitions to step S1205. If the voltage of the VBUS terminal 1103 that is detected by the VBUS voltage detection unit 1109 is less than a predetermined voltage value, the detection determination unit 1113 determines that the predetermined voltage has not been detected. Step S1205 and thereafter is processing for determining a type of the connected external device based on change of the state of the voltage value at the VBUS terminal 1103 when the state of the connection between the CC terminal 1104 and ground is caused to change from a disconnected state to a connected state. In the third embodiment, whether the external device is Type-C is determined in accordance with whether the predetermined voltage appears at the VBUS terminal 1103 within a predetermined period, in response to changing to a state where the CC terminal 1104 is pulled down to ground.

In step S1205, the second switch control unit 1110 controls the second switch 1107 to be off. Next, in step S1206, the first switch control unit 1112 controls the first switch 1106 to be off. Note that the first switch 1106 is turned on after the second switch 1107 is turned off. This is because, upon the CC terminal 1104 being pulled down to ground by the first switch 1106, when the second switch 1107 is turned on, the charge stored in the power storage unit 1108 is released to ground. After waiting for a predetermined period in step S1207, in step S1208 the detection determination unit 1113 determines whether the predetermined voltage (5V) is detected at the VBUS terminal 1103. The detection determination unit 1113 performs the above determination based on the voltage value of the VBUS terminal 1103 detected by the VBUS voltage detection unit 1109. Note that, an example of the predetermined period for which waiting is performed in step S1207 may be 275 ms or more. This is because, as described above, in a Type-C device, a period from when the voltage of the CC terminal is detected to be less than the predetermined voltage (step S1404) until when VBUS is output (step S1405) is defined to be within 275 ms.

Upon determining that the predetermined voltage has been detected at the VBUS terminal 1103, the detection determination unit 1113 advances processing to step S1209. In step S1209, the detection determination unit 1113 determines that the connected external device is a Type-C device.

Meanwhile, when it is determined in step S1208 that the predetermined voltage has not been detected at the VBUS terminal 1103, the detection determination unit 1113 advances the processing to step S1210. In step S1210, the detection determination unit 1113 determines a connection error because the connected external device 1301 is not a Type-C device and is not a device that complies with a non-Type-C USB standard.

The determination result for the type of the external device by the detection control unit 1102 is notified from the detection control unit 1102 to the system control unit 1122, and is notified from the system control unit 1122 to the power supply capability detection unit 1121. If the notified determination result indicates a Type-C device, the power supply capability detection unit 1121 detects the power supply ability of the external device by identifying the state of the CC terminal 1104. If the notified determination result indicates a non-Type-C device, the power supply capability detection unit 1121 detects the power supply ability of the external device from the signals of the D+ and the D− terminals. If the notified determination result is a connection error, the power supply capability detection unit 1121 does not execute a detection of the power supply ability.

In USB Type-C, by storing power from the CC terminal and causing a determination circuit for determining a connected device to operate as with the above configuration, it is possible to identify the connected device. In this way, by the third embodiment, in an electronic device that has a Type-C compliant interface, it is possible to determine the power supply ability of a connected the external device even if power is not supplied from VBUS or if a battery is not attached to the device.

Fourth Embodiment

Next, explanation is given for a fourth embodiment. In the third embodiment, power from the CC terminal which is a terminal for signals is used to accumulate power that can be used to determine a type of a connected device, but, in the fourth embodiment, configuration is taken such that it is possible to use the voltage of the CC terminal as is to determine the type of the connected device when the voltage of the VBUS terminal has disappeared.

Figure 10:
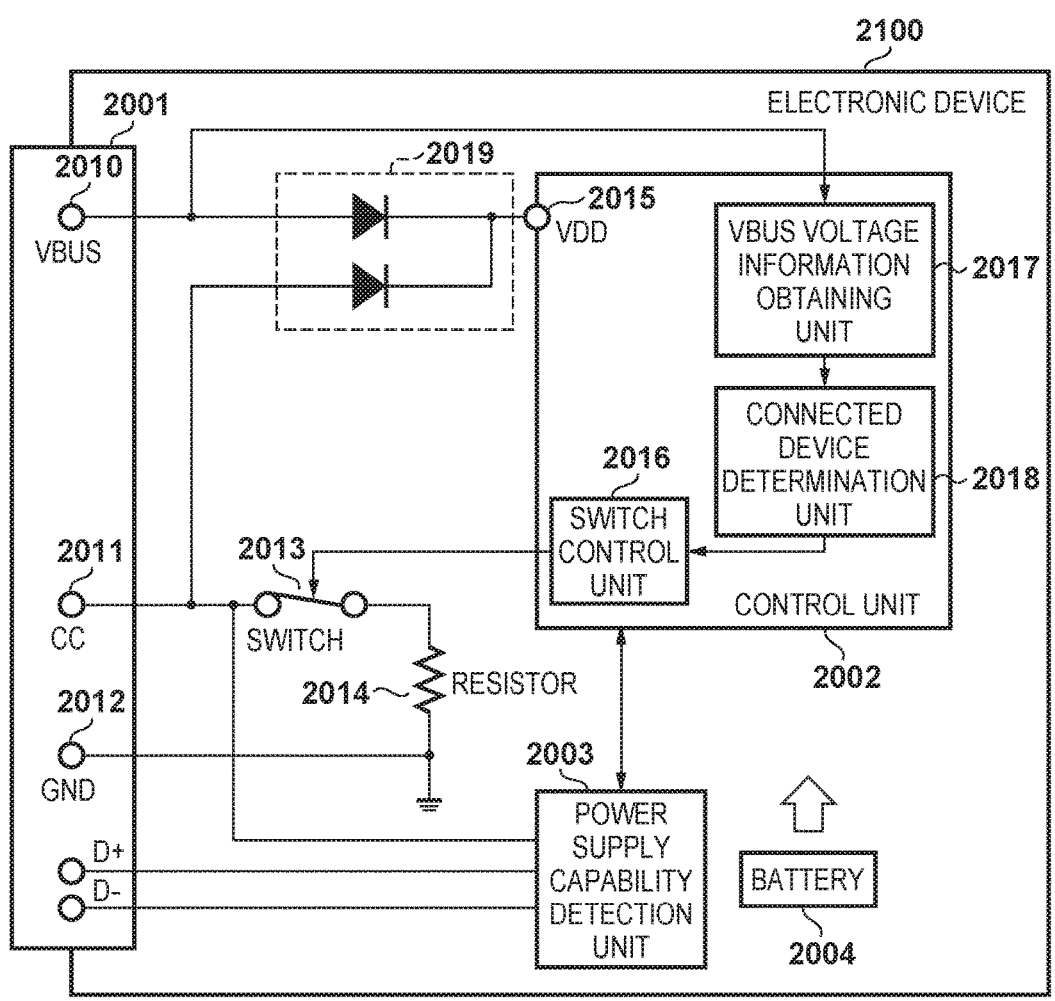
FIG. 10 is a block diagram illustrating configuration elements of the electronic device in a fourth embodiment.

FIG. 10 is a block diagram for explaining a plurality of configuration elements that an electronic device 2100 in the fourth embodiment has. Note that, similarly to in the embodiments described above, the electronic device may be any device if it is a device that can use power of an external device connected via a predetermined interface, such as a handheld device or a digital camera.

In FIG. 10, a connector unit 2001 is an interface having a connector that complies with USB Type-C. The connector unit 2001 has a VBUS terminal 2010 that can receive power from a connected external device, a CC terminal 2011 that can communicate with the external device, and a GND terminal 2012 for providing a ground to the external device. In addition, the connector unit 2001 has a D+ terminal and a D− terminal as signal terminals for transmitting signals by differentials. Note that, the CC terminal 2011 is for performing data communication, but the electronic device 2100 of the fourth embodiment can also use the CC terminal 2011, which is pulled up by the external device, as a power supply source.

A control unit 2002 determines whether the external device connected to the connector unit 2001 is a Type-C device, and controls a switch 2013. The control unit 2002, for example has at least one microcomputer (or microprocessor), and a memory that stores programs that are executed by the at least one microcomputer. By the microcomputer executing a predetermined program, the control unit 2002 realizes functions of a VDD terminal 2015, a switch control unit 2016, a VBUS voltage information obtaining unit 2017, and a connected device determination unit 2018. Of course, some or all of these units may be realized by hardware. A power supply capability detection unit 2003 detects the power supply ability of the external device based on the states of a D+ terminal, a D-terminal, and the CC terminal 2011. The power supply capability detection unit 2003 switches a detection method for detecting the power supply ability of the external device, in accordance with a determination result by the connected device determination unit 2018 (in the fourth embodiment, a determination result of whether the external device is a Type-C device). A battery 2004 supplies power to each unit of the electronic device 2100.

The switch 2013 is a switch for changing a state of connection of a resistor 2014 that is connected between the CC terminal 2011 and the GND terminal 2012. A power supply changing unit 2019 is connected to the VBUS terminal 2010 and the CC terminal 2011, and supplies the VDD terminal 2015 with power (power having a higher voltage) from either one of the VBUS terminal 2010 and the CC terminal 2011. In accordance with the power supply changing unit 2019, power necessary for each unit of the control unit 2002 to function is supplied in accordance with power from the CC terminal 2011 if supply of power from the VBUS terminal 2010 becomes insufficient. Note that, in FIG. 10, the power supply changing unit 2019 has a configuration in which the VBUS terminal 2010 and the CC terminal 2011 are connected by a diode OR circuit, but any configuration may be taken if it is a configuration in which similar functions can be realized.

In the control unit 2002, the VDD terminal 2015 is a terminal for receiving a power supply to the control unit 2002. The switch control unit 2016 controls whether to have the switch 2013 be in a non-conductive state or a conductive state. Note that, in the fourth embodiment, configuration is taken such that the switch control unit 2016, the switch 2013, and the resistor 2014 are provided for changing a resistance between the CC terminal 2011 and the GND terminal 2012, and by turning the switch 2013 on and off, a state of connection between the CC terminal 2011 and the GND terminal 2012 is switched between a connected state and a disconnected state, but there is no limitation to this. For example, configuration may be taken to switch the resistance of a pull-down resistor by switching of the switch 2013. The VBUS voltage information obtaining unit 2017 obtains voltage information of the VBUS terminal 2010. The connected device determination unit 2018 determines the type of the external device (whether it is a Type-C device) connected to the connector unit 2001 based on change of the voltage of the VBUS terminal 2010 arising in accordance with change of the resistance between the CC terminal 2011 and the GND terminal 2012.

Figure 11:
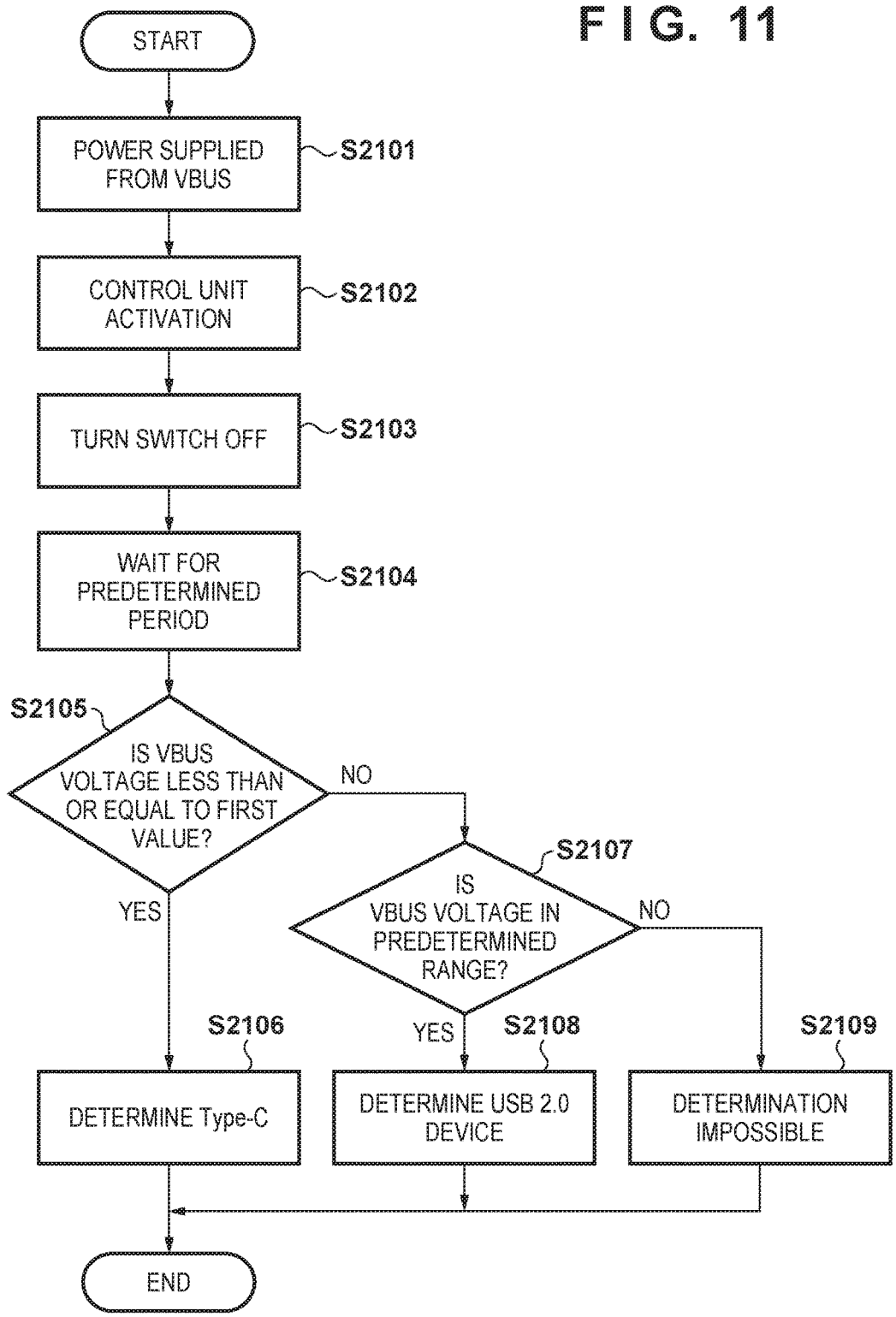
FIG. 11 is a flowchart for explaining processing for determining a type of a connected device performed by the electronic device in a fourth embodiment.

FIG. 11 is a flowchart for explaining connected device determination processing that is performed by the electronic device 2100 in a fourth embodiment. With reference to FIG. 11, explanation is given in detail below for processing by the control unit 2002 for determining the type of the connected external device.

When the external device is connected to the connector unit 2001, the VBUS terminal 2010, the CC terminal 2011, and the GND terminal 2012 are connected to the external device. In a Type-C device, power is supplied to the VBUS terminal if the CC terminal is pulled down by a predetermined resistance, and power is not supplied to the VBUS terminal in other cases. In addition, in a non-Type-C device such as for USB 2.0, power is constantly supplied to the VBUS terminal. In the electronic device 2100, an initial state of the switch 2013 is a conductive state, and the CC terminal 2011 is pulled down to ground via the resistor 2014 that has the above predetermined resistance. Accordingly, power is supplied to the VBUS terminal 2010 from the external device regardless of whether the external device is a Type-C device or a non-Type-C device. The voltage of the CC terminal 2011 becomes a value that is divided in accordance with a ratio of the resistance of the resistor 2014 with respect to the pull-up resistor of the CC terminal in the external device, and this is lower than the voltage of the VBUS terminal 2010. Accordingly, power from the VBUS terminal 2010 is supplied to the VDD terminal 2015 of the control unit 2002 (step S2101). When power from the VBUS terminal 2010 is supplied to the VDD terminal 2015 via the power supply changing unit 2019, the control unit 2002 activates (step S2102).

In the case of a Type-C device, power supply to VBUS is stopped in response to the CC terminal not being pulled down. In the case of a non-Type-C device, power supply to VBUS continues irrespective of the state of the CC terminal. In the following steps, the type of the external device is determined by using the difference of VBUS control for a Type-C device and a non-Type-C device. In other words, the type of the external device is determined based on change of the voltage value of the VBUS terminal 2010 arising in accordance with change of the resistance between the CC terminal 2011 and the GND terminal 2012.

Firstly, in step S2103, the connected device determination unit 2018 instructs the switch control unit 2016 to have the switch 2013 enter the non-conductive state, and the CC terminal 2011 and the resistor 2014 enter a non-connected state. In the fourth embodiment, switching of the switch 2013 in step S2103 is performed in a state where power supply to the VBUS terminal 2010 is being performed. In step S2104, the connected device determination unit 2018 waits for a predetermined period. In the document "USB Type-C Specification Release 1.0", in the case of Type-C, turning VBUS off to 0V within 650 ms after a DFP side detects that a CC terminal pull-down resistance of a UFP side has ceased to be connected is stipulated. Accordingly, by having the wait period in step S2104 be 650 msec or more, a determination of whether the connected device is a Type-C device based on the state of the power supply to the VBUS terminal is possible.

In step S2105, the connected device determination unit 2018 obtains voltage information of the VBUS terminal 2010 from the VBUS voltage information obtaining unit 2017, and determines whether the VBUS voltage at the VBUS terminal 2010 is less than or equal to a first predetermined value. Note that, because power from the CC terminal 2011 is supplied to the VDD terminal 2015 via the power supply changing unit 2019 even if the VBUS voltage decreases, the control unit 2002 can continue operation without obstacle. This is because the voltage of the CC terminal 2011 increases before the voltage of the VBUS terminal 2010 decreases, by the switch 2013 entering the non-conductive state in step S2103. In this way, in accordance with the power supply changing unit 2019, the power supply source for the control unit 2002 switches from VBUS to CC, and the control unit 2002 can continue operating even after the VBUS voltage has decreased. Meanwhile, if the VBUS voltage is maintained, the power supply source for the control unit 2002 remains as VBUS.

In step S2105 VBUS becomes 0V in the case of Type-C, and a value of 4.75V to 5.25V in the case of USB 2.0. In step S2105, a first voltage used in a comparison with the voltage of the VBUS terminal 2010 may be any voltage for which a determination of Type-C or non-Type-C (USB 2.0) is possible, and in the fourth embodiment is 1.0V for example.

If the voltage of the VBUS terminal 2010 is less than or equal to the first predetermined value (1.0V) in step S2105, in step S2106 the connected device determination unit 2018 determines that the connected external device is a Type-C device. Meanwhile, if the voltage of the VBUS terminal 2010 is greater than the first predetermined value (1.0V) in step S2105, it is determined that the connected external device is not a Type-C device, and the processing proceeds to step S2107. In step S2107, the connected device determination unit 2018 obtains voltage information of the VBUS terminal 2010 from the VBUS voltage information obtaining unit 2017, and determines whether the voltage of the VBUS terminal 2010 is within a predetermined range. In step S2107, if it is determined that the voltage of the VBUS terminal 2010 is within a predetermined range, the processing proceeds to step S2108, and otherwise the processing proceeds to step S2109. Note that, to determine whether the connected external device is USB 2.0 in step S2107, the predetermined range of the voltage value is set to 4.75V to 5.25V which is the VBUS range stipulated in USB 2.0.

If it is determined that the voltage of the VBUS terminal 2010 is in the range of 4.75V to 5.25V, in step S2108 the connected device determination unit 2018 determines that the connected external device is a USB 2.0, non-Type-C device. Meanwhile, if the voltage of the VBUS terminal 2010 is not in the range of 4.75V to 5.25V, in step S2109 the connected device determination unit 2018 sets the type of connected external device as determination impossible.

Figure 12A:
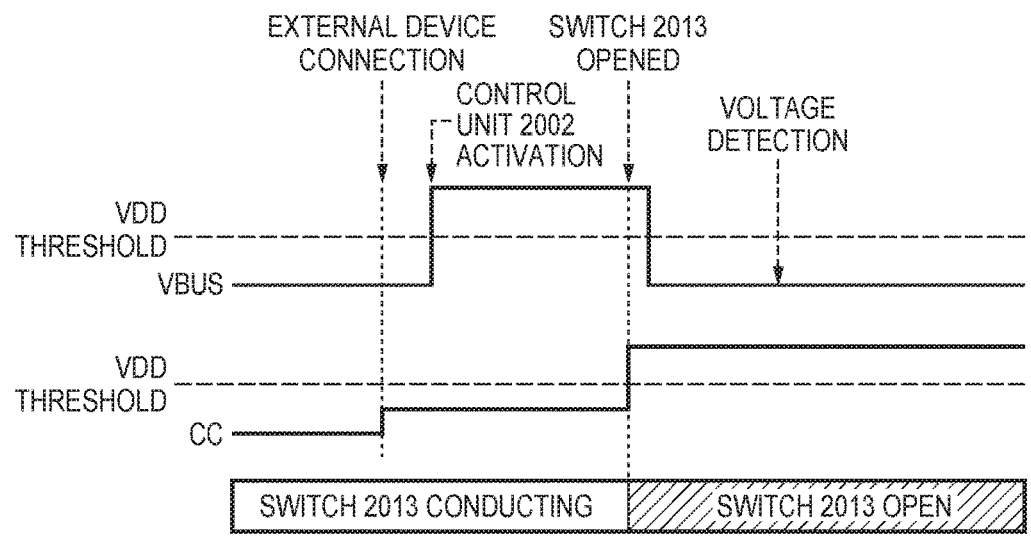
FIG. 12A and FIG. 12B are views for explaining electric power supply states in a case where an external device that is a Type-C device is connected to the electronic device of the fourth embodiment.
Figure 12B:
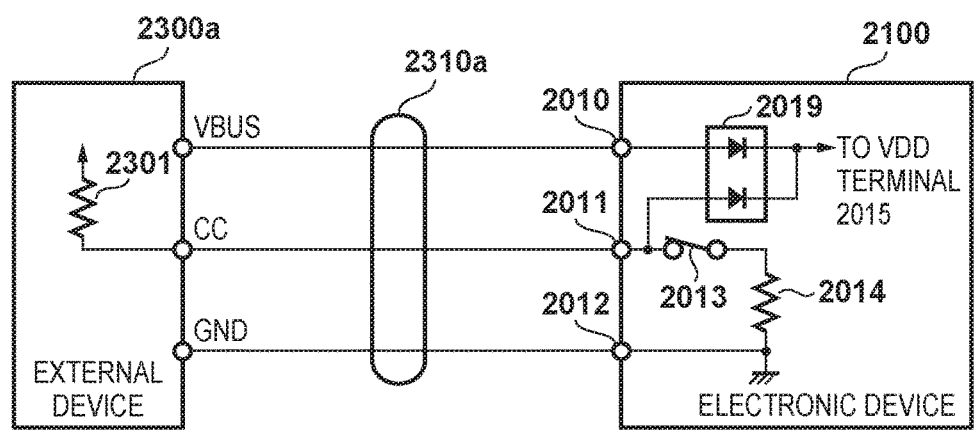

Next, with reference to FIG. 12A and FIG. 12B, explanation is given for a transition of the control unit 2002 (the VDD terminal 2015) to a power supply state when a Type-C device is connected. FIG. 12A illustrates a relationship between an operating voltage threshold value of the control unit 2002 (also referred to as a VDD threshold value) and the voltages of the CC terminal 2011 and the VBUS terminal 2010 when a Type-C external device is connected. In addition, FIG. 12B illustrates a state of connection for the VBUS terminal, the CC terminal, and the GND terminal when an external device 2300a that is a Type-C device, and the electronic device 2100 are connected. The external device 2300a and the electronic device 2100 are connected by a cable 2310a.

A VDD threshold value indicates a lower limit of an operating voltage for the VDD terminal 2015 of the control unit 2002, and the control unit 2002 can operate when voltage applied to the VDD terminal 2015 is greater than or equal to the VDD threshold value. For the VDD threshold value, an operating voltage for a typical microcomputer is envisioned, and in the fourth embodiment the VDD threshold value is 1.8V for example. However, the VDD threshold value is decided in accordance with an operating voltage for the control unit 2002, and is not limited to this example.

When the external device is not connected to the connector unit 2001, the switch 2013 is in a conductive state, and the CC terminal 2011 and the resistor 2014 are in a connected state. When the external device is connected to the connector unit 2001 in this state, a divided voltage occurs at the CC terminal 2011 in accordance with the resistor 2014 of the electronic device 2100 which is a UFP side, and a pull-up resistor 2301 for the external device 2300a which is a DFP side. When power is supplied from the VBUS terminal 2010, a voltage above the VDD threshold value is supplied to the VDD terminal 2015 via the power supply changing unit 2019, and the control unit 2002 activates.

When the control unit 2002 is activated, the connected device determination unit 2018 instructs the switch control unit 2016 to have the switch 2013 enter a non-conductive state (step S2103). When the switch 2013 enters the non-conductive state, the pull-down resistor connected to the CC terminal 2011 of the UFP side (the electronic device 2100) ceases from the perspective of the DFP side (the external device 2300a). Meanwhile, because the CC terminal of the DFP side is pulled up via the pull-up resistor 2301, a pulled up voltage for the DFP side arises at the CC terminal 2011. The pull-up voltage for the DFP side is 5V, 3.3V, or the like.

In this way, when a state of connection between the CC terminal 2011 and the GND terminal 2012 becomes a disconnected state, a state is entered in which power from the CC terminal 2011 can be provided to the VDD terminal 2015 as power for causing the control unit 2002 to function.

In "USB Type-C Specification Release 1.0", turning VBUS off to 0V within 650 msec after a DFP side which is the external device 2300a recognizes that a CC terminal pull-down resistor of a UFP side has ceased is stipulated. Accordingly, when the switch 2013 enters a non-conductive state, the voltage of the VBUS terminal 2010 becomes approximately zero. In power supply to the VDD terminal 2015, the voltage of the CC terminal 2011 becomes greater than or equal to the VDD threshold value by the pull-up voltage of the DFP side before the voltage of the VBUS terminal 2010 becomes less than or equal to the VDD threshold value. Therefore, in the power supply changing unit 2019, a power source for the control unit 2002 switches from VBUS to CC, and operation of the control unit 2002 can continue. Subsequently, the VBUS voltage obtained by the VBUS voltage information obtaining unit 2017 is less than or equal to the threshold is detected (step S2105), and the connected device determination unit 2018 determines that the connected external device 2300a is a Type-C device (step S2106).

Figure 13A:
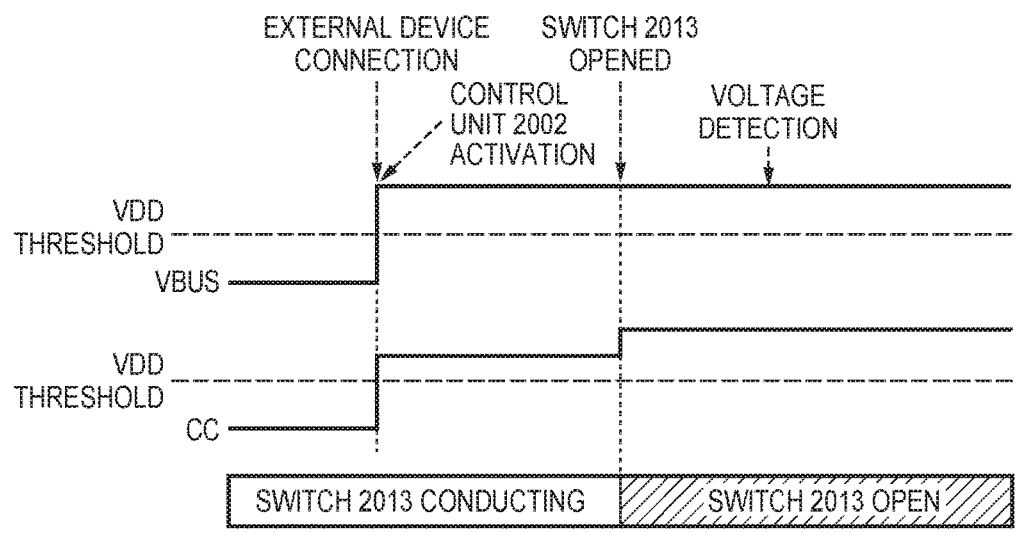
FIG. 13A and FIG. 13B are views for explaining electric power supply states in a case where an external device that is a non-Type-C device is connected to the electronic device of the fourth embodiment.
Figure 13B:
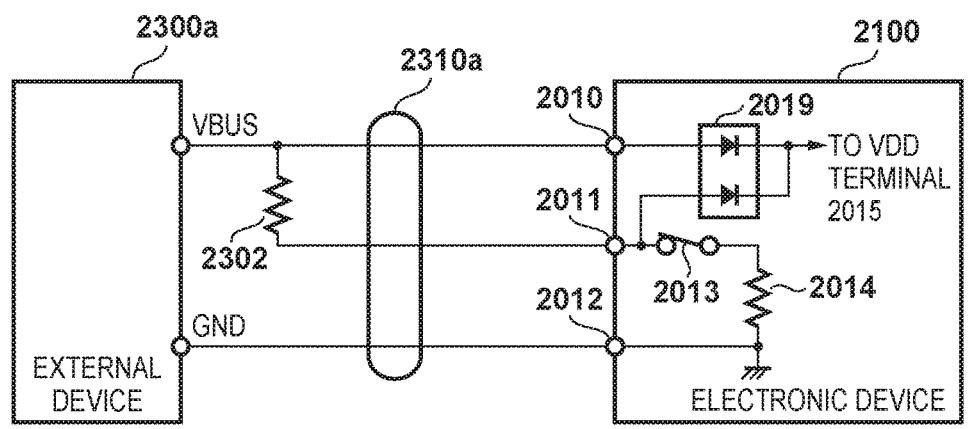

Next, with reference to FIG. 13A and FIG. 13B, explanation is given for a transition of the control unit 2002 (the VDD terminal 2015) to a power supply state when a non-Type-C device is connected. FIG. 13A illustrates a relationship between an operating voltage threshold value of the control unit 2002 and the voltages of the CC terminal 2011 and the VBUS terminal 2010 when a USB 2.0 device is connected. In addition, FIG. 13B illustrates a state of connection for the VBUS terminal, the CC terminal, and the GND terminal when an external device 2300b that is a non-Type-C device, and the electronic device 2100 are connected. As illustrated in FIG. 13B, a CC line that is pulled up to the VBUS line via a resistor 2302 is provided in the cable 2310b that connects the electronic device 2100 and the external device 2300b which is a non-Type-C device.

As described above, when the external device is not connected, the switch 2013 of the electronic device 2100 is in a conductive state. When the external device 2300b is connected, an approximately 5V voltage is supplied from VBUS, and the control unit 2002 is activated by being supplied with a voltage that exceeds the VDD threshold value. At that time, the VBUS voltage is divided by the resistor 2302 and the resistor 2014 and is applied to the CC terminal 2011. Because the divided value is less than the voltage from the VBUS terminal 2010, the power supply changing unit 2019 supplies power supplied from the VBUS terminal 2010 to the VDD terminal 2015.

When the control unit 2002 is activated, the connected device determination unit 2018 instructs the switch control unit 2016 to have the switch 2013 enter a non-conductive state (step S2103). Because the external device 2300b is a non-Type-C device, VBUS continues to be supplied even if the switch 2013 enters the non-conductive state, and the control unit 2002 can continue operation. Subsequently, the VBUS voltage obtained by the VBUS voltage information obtaining unit 2017 is in a predetermined range is detected (step S2107), and the connected device determination unit 2018 determines that the connected external device 2300b is a USB 2.0 device (step S2108).

As explained above, by the fourth embodiment, a configuration is taken such that it is possible to accept a power supply from either of the CC terminal 2011 provided for performing communication and the VBUS terminal 2010 in the power supply changing unit 2019. In this way, it is possible to cause the control unit 2002 to operate without using a power storage unit such as a capacitor or the battery 2004, and it is possible to determine whether a connected external device is a Type-C device or a non-Type-C device (for example USB 2.0).

Another Embodiment

Explanation is added regarding change of the CC terminal voltage that is performed for determining whether a connected device is a Type-C device, as explained in the first to fourth embodiments. In a Type-C device, determination as to whether a device is connected is performed based on whether a voltage value of the CC terminal is included in a predetermined range. This predetermined range is stipulated in a standard, and includes a voltage range of 0.2V to 2.04V for example. A Type-C device stops output of a VBUS voltage upon determining that a device is not connected in accordance with the voltage value of the CC terminal. Making use of this, in the above first, second and fourth embodiments, a determination of whether a connected device is a Type-C device is performed in accordance with change of a VBUS terminal voltage when the CC terminal voltage is changed from a voltage included in a predetermined range to a voltage outside of a predetermined range. In addition, in the third embodiment, whether or not a connected device is a Type-C device is determined in accordance with change of the VBUS terminal voltage when the CC terminal voltage changes from a voltage outside of a predetermined range to a voltage that is included in a predetermined range. In the above first to fourth embodiments, as a control configuration for changing the CC terminal voltage, a configuration in which a pull-down resistance for causing the CC terminal to have a pull-down connection to the GND terminal is caused to change (including disconnecting the pull-down connection). However, a configuration for changing the CC terminal voltage is not limited to changing the pull-down resistor that is recited in these embodiments, and may be any configuration if it is a configuration in which the CC terminal voltage changes between being inside and outside of a predetermined range.

In addition, explanation was given for an electronic device in the above first to fourth embodiments, but there is no limitation to this. Implementation may be performed as a control apparatus (for example an IC chip) that realizes the aforementioned control for determining whether a connected device is a Type-C device or a non-Type-C device. Alternatively, such a control apparatus may be realized as a portion of a USB control chip, for example. For example, in the case of the configuration of FIG. 2, a control apparatus therefor can comprise the connected device determination unit 211, the switch control unit 212, the switch 213, and the VBUS voltage value obtaining unit 215. In addition, in the case of the configuration of FIG. 4, a control apparatus can comprise the connected device determination unit 211, the switch control unit 212, the switch 213, the VBUS voltage value obtaining unit 215, the power storage unit 401, and the power storage state detection unit 402. In the case of FIG. 6, it is possible to configure the detection control unit 1102 or the Type-C determination unit 1101 as a control apparatus. In the case of FIG. 10, a control apparatus can comprise the control unit 2002. Alternatively, a control apparatus can comprise the control unit 2002, the switch 2013, the resistor 2014, and the power supply changing unit 2019.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-142722, filed Jul. 20, 2016, No. 2016-142723, filed Jul. 20, 2016, and No. 2016-142724, filed Jul. 20, 2016, which are hereby incorporated by reference herein in their entirety.

What is claimed is:

1. An electronic device, comprising:
a first terminal for receiving power from a connected external device;
a second terminal for obtaining information of the external device;
a control unit configured to control a voltage of the second terminal;
a determination unit configured to determine a type of the external device in accordance with a voltage of the first terminal after a predetermined period has elapsed since the control unit changed the voltage of the second terminal from a voltage included in a predetermined range to a voltage not in the predetermined range; and
a power supply unit configured to perform a process related to a power supply via the first terminal from the external device, based on the type of the external device determined by the determination unit.

2. The electronic device according to claim 1, wherein
the voltage of the second terminal is used in determining whether or not the external device is in a connected state, and
the voltage included in the predetermined range is a voltage for determining that the external device is in the connected state, and the voltage outside of the predetermined range is a voltage for determining that the external device is in a non-connected state.

3. The electronic device according to claim 1, wherein the determination unit determines that the type of the external device is a first type in a case that a voltage value of the first terminal changes to a voltage value included in a first range after the predetermined period elapses since the control unit controlled the voltage of the second terminal to the voltage outside of the predetermined range.

4. The electronic device according to claim 3, wherein the first range is a voltage range of less than or equal to 1.0V.

5. The electronic device according to claim 3, wherein the determination unit determines that the type of the external device is a second type in a case that the voltage value of the first terminal changes to a voltage value included in a second range, which differs the first range after the predetermined period elapses since the control unit controlled the voltage of the second terminal to the voltage outside of the predetermined range.

6. The electronic device according to claim 5, wherein the second range is a voltage range of 4.75V to 5.25V.

7. The electronic device according to claim 1, wherein
the electronic device is provided with an interface that complies with USB Type-C,
the first terminal is a VBUS terminal included in the interface that complies with USB Type-C, and
the second terminal is a CC terminal included in the interface that complies with USB Type-C.

8. A method of controlling an electronic device provided with a first terminal for receiving power from a connected external device, and a second terminal for obtaining information of the external device, the method comprising:

changing, by at least one of a circuitry and a processor, a voltage of the second terminal from a voltage included in a predetermined range to a voltage outside of the predetermined range;

determining, by at least one of the circuitry and the processor, a type of the external device in accordance with a voltage of the first terminal after a predetermined period has elapsed since the voltage of the second terminal was changed to the voltage outside of the predetermined range; and performing, by at least one of the circuitry and the processor, a process related to a power supply via the first terminal from the external device, based on the type of the external device determined by the determining.

9. The electronic device according to claim 1, further comprising
a GND terminal configured to provide a ground, and connected to the second terminal, wherein
the control unit controls the voltage of the second terminal by changing a resistance between the second terminal and the GND terminal.

10. The electronic device according to claim 3, further comprising an obtaining unit configured to obtain a power supply ability of the external device,
wherein the obtaining unit, if the type of the external device is determined to be the first type, obtains the power supply ability of the external device based on a voltage of the second terminal.

11. The electronic device according to claim 5, further comprising an obtaining unit configured to obtain a power supply ability of the external device,
wherein the obtaining unit, if the type of the external device is determined to be the second type, obtains the power supply ability of the external device based on a voltage of a third terminal that is different to the first terminal and the second terminal.

12. The electronic device according to claim 9, wherein the determination unit determines the type of the external device based on the voltage of the first terminal after the control unit changes the second terminal and the GND terminal from a state of being connected to one another via a predetermined resistor to a disconnected state.

13. The electronic device according to claim 1, wherein the predetermined period is less than or equal to 1000 msec.

14. The electronic device according to claim 1, further comprising a supply unit configured to supply the determination unit and the control unit with power.

15. The electronic device according to claim 14, wherein the supply unit is a capacitor charged by power received by the first terminal.

16. The electronic device according to claim 14, wherein the supply unit supplies the determination unit and the control unit with power obtained from the external device.

17. The electronic device according to claim 1, further comprising a GND terminal configured to provide a ground, and connected to the second terminal,
wherein the determination unit determines the type of the external device based on the voltage of the first terminal after the control unit switches from a state in which the second terminal and the GND terminal are not connected to a state where the second terminal and the GND terminal are connected.

18. The electronic device according to claim 17, further comprising a power storage unit configured to accumulate power obtained from the external device via the second terminal, and supply the determination unit and the control unit with power,
wherein the power storage unit obtains power from the external device in the state in which the second terminal and the GND terminal are not connected.

19. The electronic device according to claim 18, further comprising a switch for controlling a connection between the second terminal and the power storage unit,
wherein, if the electronic device is connected to the external device,
the control unit controls so as to enter a state in which the second terminal and the GND terminal are not connected, and the switch controls so as to connect the second terminal and the power storage unit,
in accordance with an accumulation of predetermined power in the power storage unit, the switch controls so that the second terminal and the power storage unit are not connected, and
in accordance with the second terminal and the power storage unit entering a non-connected state, the control unit switches from the state in which the second terminal and the GND terminal are not connected to the state in which the second terminal and the GND terminal are connected.

20. The electronic device according to claim 9, wherein the control unit changes the resistance between the second terminal and the GND terminal after the electronic device connects to the external device and before communicating with the external device via the second terminal.

21. The electronic device according to claim 1, further comprising
a power control unit configured to control a power reception process for receiving power from a connected external device via the first terminal;
wherein the first control unit controls the power reception process in accordance with the type of the external device determined by the determination unit.

22. An electronic device, comprising:
a first terminal configured to receive power from a connected external device;
a second terminal configured to obtain information of the external device, and
at least one of a circuitry and a processor that (1) controls a voltage of the second terminal, (2) determines a type of the external device in accordance with a voltage of the first terminal after a predetermined period has elapsed since the voltage of the second terminal was changed from a voltage included in a predetermined range to a voltage not in the predetermined range, and (3) performs a process related to a power supply via the first terminal from the external device, based on the type of the external device determined.

23. The electronic device according to claim 22, wherein at least one of the circuitry and the processor determines that the type of the external device is a first type in a case that a voltage value of the first terminal changes to a voltage value included in a first range after the predetermined period has elapsed since the voltage of the second terminal was changed from the voltage included in a predetermined range to the voltage not in the predetermined range.

24. The electronic device according to claim 23, wherein the first range is a voltage range of less than or equal to 1.0V.

25. The electronic device according to claim 23, wherein if the type of the external device is determined to be the first type, at least one of the circuitry and the processor obtains a power supply ability of the external device based on a voltage of the second terminal.

26. The electronic device according to claim 23, wherein at least one of the circuitry and the processor determines that the type of the external device is a second type in a case that the voltage value of the first terminal changes to a voltage value included in a second range which differs the first range, after the predetermined period has elapsed since the voltage of the second terminal was changed from the voltage included in a predetermined range to the voltage not in the predetermined range.

27. The electronic device according to claim 26, wherein the second range is a voltage range of 4.75V to 5.25V.

28. The electronic device according to claim 26, wherein if the type of the external device is determined to be the second type, at least one of the circuitry and the processor obtains a power supply ability of the external device based on a voltage of a third terminal that is different to the first terminal and the second terminal.

29. The electronic device according to claim 22, wherein
the electronic device is provided with an interface that complies with USB Type-C,
the first terminal is a VBUS terminal included in the interface that complies with USB Type-C, and
the second terminal is a CC terminal included in the interface that complies with USB Type-C.

30. The electronic device according to claim 22, further comprising a GND terminal configured to provide a ground, and connected to the second terminal via a resistance, wherein
at least one of the circuitry and the processor controls the voltage of the second terminal by changing a resistance between the second terminal and the GND terminal.

31. The electronic device according to claim 30, wherein at least one of the circuitry and the processor changes the resistance between the second terminal and the GND terminal after the electronic device connects to the external device and before communicating with the external device via the second terminal.

32. The electronic device according to claim 22, wherein the predetermined period is less than or equal to 1000 msec.

33. The electronic device according to claim 22, further comprising a power supply configured to supply the circuitry with power.

34. The electronic device according to claim 33, wherein the power supply is a capacitor charged by power received by the first terminal.

35. The electronic device according to claim 33, wherein the power supply supplies at least one of the circuitry and the processor with power obtained from the external device.

36. The electronic device according to claim 22, further comprising a GND terminal configured to provide a ground, and connected to the second terminal,
wherein the circuitry determines the type of the external device based on the voltage of the first terminal after a connection state between the second terminal and the GND terminal is changed from a state in which the second terminal and the GND terminal are not connected, to a state in which the second terminal and the GND terminal are connected.

37. The electronic device according to claim 22, wherein at least one of the circuitry and the processor performs a power reception process for receiving power from a connected external device via the first terminal, in accordance with the type of the external device.

38. An electronic device, comprising:
a first terminal configured to receive power from a connected external device;
a second terminal configured to obtain information of the external device, and
at least one of a circuitry and a processor that (1) changes a voltage of the second terminal from a voltage included in a predetermined range to a voltage not in the predetermined range, and (2) performs a process related to a power supply via the first terminal from the external device, based on a voltage of the first terminal after a predetermined period has elapsed since the voltage of the second terminal was changed from the voltage included in the predetermined range to the voltage not in the predetermined range.

39. The electronic device according to claim 38, wherein at least one of the circuitry and the processor obtains a power supply ability of the external device based on a voltage of the second terminal in a case that a voltage value of the first terminal changes to a voltage value included in a first range after the predetermined period has elapsed since the voltage of the second terminal was changed from the voltage included in the predetermined range to the voltage not in the predetermined range.

40. The electronic device according to claim 39, wherein the first range is a voltage range of less than or equal to 1.0V.

41. The electronic device according to claim 38, wherein at least one of the circuitry and the processor obtains a power supply ability of the external device based on a voltage of a third terminal that is different to the first terminal and the second terminal, in a case that the voltage value of the first terminal changes to a voltage value included in a second range which differs the first range, after the predetermined period has elapsed since the voltage of the second terminal was changed from the voltage included in the predetermined range to the voltage not in the predetermined range.

42. The electronic device according to claim 41, wherein the second range a voltage range of 4.75V to 5.25V.

43. The electronic device according to claim 38, wherein
the electronic device is provided with an interface that complies with USB Type-C,
the first terminal is a VBUS terminal included in the interface that complies with USB Type-C, and
the second terminal is a CC terminal included in the interface that complies with USB Type-C.

44. The electronic device according to claim 38, further comprising a GND terminal configured to provide a ground, and connected to the second terminal via a resistance, wherein
at least one of the circuitry and the processor controls the voltage of the second terminal by changing a resistance between the second terminal and the GND terminal.

45. The electronic device according to claim 44, wherein at least one of the circuitry and the processor changes the resistance between the second terminal and the GND terminal after the electronic device connects to the external device and before communicating with the external device via the second terminal.

46. The electronic device according to claim 38, wherein the predetermined period is less than or equal to 1000 msec.

47. The electronic device according to claim 38, further comprising a power supply configured to supply at least one of the circuitry and the processor with power.

48. The electronic device according to claim 38, further comprising a GND terminal configured to provide a ground, and connected to the second terminal, wherein at least one of the circuitry and the processor performs a process related to a power supply via the first terminal from the external device, based on the voltage of the first terminal after a connection state between the second terminal and the GND terminal is changed from a state in which the second terminal and the GND terminal are not connected, to a state in which the second terminal and the GND terminal are connected.

49. The electronic device according to claim 38, wherein at least one of the circuitry and the processor performs a first process related to a power supply via the first terminal from the external device in a case that a voltage value of the first terminal changes to a voltage value included in a first range after the predetermined period has elapsed since the voltage of the second terminal was changed from the voltage included in the predetermined range to the voltage not in the predetermined range, and performs a second process related to a power supply via the first terminal from the external device in a case that a voltage value of the first terminal changes to a voltage value included in a second range after the predetermined period has elapsed since the voltage of the second terminal was changed from the voltage included in the predetermined range to the voltage not in the predetermined range.

* * * * *